US009973398B1

(12) United States Patent
Sieracki et al.

(10) Patent No.: US 9,973,398 B1
(45) Date of Patent: May 15, 2018

(54) SYSTEM AND METHOD FOR DISCRIMINATING REMOTE SITE ORIGINATION OF COMMUNICATION SIGNALS TRANSMITTED THROUGH A NETWORK BASED ON ENVELOPE CHARACTERISTICS

(71) Applicants: Jeffrey Mark Sieracki, Silver Spring, MD (US); John J. Dellomo, Silver Spring, MD (US)

(72) Inventors: Jeffrey Mark Sieracki, Silver Spring, MD (US); John J. Dellomo, Silver Spring, MD (US)

(73) Assignee: Reality Analytics, Inc., New York, NY (US)

( * ) Notice: Subject to any disclaimer, the term of this patent is extended or adjusted under 35 U.S.C. 154(b) by 252 days.

(21) Appl. No.: 13/665,916

(22) Filed: Oct. 31, 2012

Related U.S. Application Data

(60) Provisional application No. 61/553,944, filed on Oct. 31, 2011.

(51) Int. Cl.
 *G06F 15/177* (2006.01)
 *H04L 12/26* (2006.01)
(52) U.S. Cl.
 CPC .................. *H04L 43/04* (2013.01)
(58) Field of Classification Search
 CPC .. G06N 99/005; G06N 7/007; G06F 19/3437; H04L 43/04
 USPC ....................................................... 709/224
 See application file for complete search history.

(56) References Cited

U.S. PATENT DOCUMENTS

| 5,400,261 | A | 3/1995 | Reynolds |
| 5,436,653 | A | 7/1995 | Ellis et al. |
| 5,437,050 | A | 7/1995 | Lamb et al. |
| 6,735,703 | B1 * | 5/2004 | Kilpatrick et al. ............. 726/23 |
| 7,346,925 | B2 * | 3/2008 | Marcjan .......................... 726/12 |

(Continued)

OTHER PUBLICATIONS

Fang Yu, et al., "Gigabit Rate Packet Pattern Matching Using TCAM," Computer Science Division (EECS),pp. 1-12.

*Primary Examiner* — Oleg Survillo
*Assistant Examiner* — Tan Doan
(74) *Attorney, Agent, or Firm* — Rosenberg, Klein & Lee

(57) ABSTRACT

A system and method are provided for distinguishing between a plurality of remote sites accessed through a network interconnection by a reference site based upon envelope characteristics of communication signals transmitted therebetween. Communications signals transmitted during an interconnected session established between one of the remote sites and the reference site are time-captured in a plurality of data segments. The time-captured segments are parsed to selectively generate for each the interconnected remote sites an envelope signal indicative of at least one resource allocation response thereof during the interconnection session, the envelope signal being defined by values of at least a first predetermined envelope parameter acquired from the time-captured segments. Based on the envelope signal, a characteristic signature is established for each interconnected remote site to be identified. Newly-captured communication signal segments are thereby classified in remote site origination based on the characteristic signatures of identified remote sites.

38 Claims, 16 Drawing Sheets

(56) References Cited

U.S. PATENT DOCUMENTS

| | | |
|---|---|---|
| 7,486,799 B2 | 2/2009 | Rhoads |
| 7,554,983 B1 * | 6/2009 | Muppala ................. 370/392 |
| 7,587,760 B1 * | 9/2009 | Day ....................... 709/223 |
| 7,620,807 B1 | 11/2009 | Spatscheck et al. |
| 7,986,913 B2 | 7/2011 | Wang |
| 8,135,091 B2 | 3/2012 | Alexander et al. |
| 2004/0093413 A1 * | 5/2004 | Bean et al. ............... 709/224 |
| 2005/0281344 A1 * | 12/2005 | Wall ..................... H04L 1/00 |
| | | 375/259 |
| 2006/0143710 A1 * | 6/2006 | Desai ................. G06F 21/552 |
| | | 726/23 |
| 2007/0136813 A1 * | 6/2007 | Wong ....................... 726/25 |
| 2008/0208979 A1 * | 8/2008 | Vishwanath ...... H04L 29/12594 |
| | | 709/206 |
| 2008/0281915 A1 * | 11/2008 | Elad et al. ................ 709/204 |
| 2009/0077164 A1 * | 3/2009 | Phillips et al. ............. 709/203 |
| 2009/0129288 A1 * | 5/2009 | Hernacki ............ H04L 41/142 |
| | | 370/253 |
| 2009/0313693 A1 * | 12/2009 | Rogers ...................... 726/21 |
| 2010/0205297 A1 | 8/2010 | Sarathy |
| 2010/0205665 A1 | 8/2010 | Komili et al. |
| 2010/0238835 A1 | 9/2010 | Lundgren et al. |
| 2011/0182290 A1 | 7/2011 | Perkins |
| 2011/0185354 A1 * | 7/2011 | Tanner et al. ............. 717/178 |
| 2011/0197071 A1 * | 8/2011 | Wolcott ............ H04L 25/03019 |
| | | 713/176 |
| 2011/0268275 A1 * | 11/2011 | Singhal ............. H04L 63/0428 |
| | | 380/270 |
| 2012/0190380 A1 | 7/2012 | Dupray et al. |
| 2012/0216265 A1 | 8/2012 | Mansour et al. |
| 2012/0221497 A1 | 8/2012 | Goyal et al. |
| 2012/0224617 A1 | 9/2012 | Feher |

* cited by examiner

Fig. 1A

| No. | Date | Time | Packet Length | Source | Destination | Protocol | Rqst Mthd | URI | NxtSeqNum | AckNum | SourcePort | DestinationPort | Host |
|---|---|---|---|---|---|---|---|---|---|---|---|---|---|
| 2176436 | 2011-09-21 | 01:10:42.462863 | 207 | 69.244.66.17 | 63.69.72.43 | HTTP | GET | / | | 2018 | 1 | gbjd816 | http | www.msnbc.msn.com |
| 2176441 | 2011-09-21 | 01:10:42.483461 | 1514 | 63.69.72.43 | 69.244.66.17 | HTTP | | | 1461 | 2018 | http | gbjd816 | |
| 2176442 | 2011-09-21 | 01:10:42.484448 | 1514 | 63.69.72.43 | 69.244.66.17 | HTTP | | | 2921 | 2018 | http | gbjd816 | |
| 2176443 | 2011-09-21 | 01:10:42.484518 | 1514 | 63.69.72.43 | 69.244.66.17 | HTTP | | | 4381 | 2018 | http | gbjd816 | |
| 2176444 | 2011-09-21 | 01:10:42.496578 | 1514 | 63.69.72.43 | 69.244.66.17 | HTTP | | | 5841 | 2018 | http | gbjd816 | |
| 2176447 | 2011-09-21 | 01:10:42.496576 | 1514 | 63.69.72.43 | 69.244.66.17 | HTTP | | . | 7301 | 2018 | http | gbjd816 | |
| 2176448 | 2011-09-21 | 01:10:42.497587 | 1514 | 63.69.72.43 | 69.244.66.17 | HTTP | | . | 8761 | 2018 | http | gbjd816 | |
| 2176449 | 2011-09-21 | 01:10:42.497707 | 1514 | 63.69.72.43 | 69.244.66.17 | HTTP | | . | 10221 | 2018 | http | gbjd816 | |
| 2176452 | 2011-09-21 | 01:10:42.501522 | 1514 | 63.69.72.43 | 69.244.66.17 | HTTP | | . | 11681 | 2018 | http | gbjd816 | |
| 2176454 | 2011-09-21 | 01:10:42.502521 | 1514 | 63.69.72.43 | 69.244.66.17 | HTTP | | . | 13141 | 2018 | http | gbjd816 | |
| 2176455 | 2011-09-21 | 01:10:42.503592 | 1514 | 63.69.72.43 | 69.244.66.17 | HTTP | | . | 14601 | 2018 | http | gbjd816 | |
| 2176457 | 2011-09-21 | 01:10:42.508752 | 1514 | 63.69.72.43 | 69.244.66.17 | HTTP | | . | 16061 | 2018 | http | gbjd816 | |
| 2176458 | 2011-09-21 | 01:10:42.509745 | 1514 | 63.69.72.43 | 69.244.66.17 | HTTP | | . | 17521 | 2018 | http | gbjd816 | |
| 2176459 | 2011-09-21 | 01:10:42.509817 | 1514 | 63.69.72.43 | 69.244.66.17 | HTTP | | . | 18981 | 2018 | http | gbjd816 | |
| 2176461 | 2011-09-21 | 01:10:42.513199 | 1514 | 63.69.72.43 | 69.244.66.17 | HTTP | | | 20441 | 2018 | http | gbjd816 | |
| 2176462 | 2011-09-21 | 01:10:42.514195 | 1514 | 63.69.72.43 | 69.244.66.17 | HTTP | | | 21901 | 2018 | http | gbjd816 | |
| 2176463 | 2011-09-21 | 01:10:42.514272 | 1514 | 63.69.72.43 | 69.244.66.17 | HTTP | | . | 23361 | 2018 | http | gbjd816 | |

Fig. 1C-1

| | | | | | | |
|---|---|---|---|---|---|---|
| 2176466 | 2011-09-21 01:10:42.530630 | 15.14.63.69.72.43 | 69.244.66.17 | HTTP | | | | 24821 | 2018 | http | gpjc8816 | |
| 2176468 | 2011-09-21 01:10:42.531617 | 15.14.63.69.72.43 | 69.244.66.17 | HTTP | | | | 26281 | 2018 | http | gpjc8816 | |
| 2176469 | 2011-09-21 01:10:42.531697 | 15.14.63.69.72.43 | 69.244.66.17 | HTTP | | | | 27741 | 2018 | http | gpjc8816 | |
| 2176470 | 2011-09-21 01:10:42.531750 | 15.14.63.69.72.43 | 69.244.66.17 | HTTP | | | | 29201 | 2018 | http | gpjc8816 | |
| 2176471 | 2011-09-21 01:10:42.531810 | 15.14.63.69.72.43 | 69.244.66.17 | HTTP | | | | 30661 | 2018 | http | gpjc8816 | |
| 2176472 | 2011-09-21 01:10:42.531859 | 15.14.63.69.72.43 | 69.244.66.17 | HTTP | | | | 32121 | 2018 | http | gpjc8816 | |
| 2176473 | 2011-09-21 01:10:42.531907 | 15.14.63.69.72.43 | 69.244.66.17 | HTTP | | | | 33581 | 2018 | http | gpjc8816 | |
| 2176474 | 2011-09-21 01:10:42.531956 | 15.14.63.69.72.43 | 69.244.66.17 | HTTP | | | | 35041 | 2018 | http | gpjc8816 | |
| 2176477 | 2011-09-21 01:10:42.532578 | 15.14.63.69.72.43 | 69.244.66.17 | HTTP | | | | 36501 | 2018 | http | gpjc8816 | |
| 2176479 | 2011-09-21 01:10:42.532750 | 15.14.63.69.72.43 | 69.244.66.17 | HTTP | | | | 37961 | 2018 | http | gpjc8816 | |
| 2176482 | 2011-09-21 01:10:42.544254 | 21.6.63.69.72.43 | 69.244.66.17 | HTTP | | | | 38123 | 2018 | http | gpjc8816 | |
| 2176487 | 2011-09-21 01:10:42.680261 | 20.51.69.244.66.17 | 63.69.72.43 | HTTP | GET | /default.ashx/id/21589549/ | | 4015 | 38123 | gpjc8816 | http | |
| 2176497 | 2011-09-21 01:10:42.700238 | 15.14.63.69.72.43 | 69.244.66.17 | HTTP | | | | 39583 | 4015 | http | gpjc8816 | |
| 2176498 | 2011-09-21 01:10:42.700297 | 15.14.63.69.72.43 | 69.244.66.17 | HTTP | | | | 41043 | 4015 | http | gpjc8816 | |
| 2176499 | 2011-09-21 01:10:42.700357 | 15.14.63.69.72.43 | 69.244.66.17 | HTTP | | | | 42503 | 4015 | http | gpjc8816 | |
| 2176500 | 2011-09-21 01:10:42.700381 | 15.14.69.244.66.17 | 63.69.72.43 | HTTP | GET | /id/37631270/ | | 1461 | 1 | moshebeeri | http | www.msnb |
| 2176501 | 2011-09-21 01:10:42.700390 | 57.4.69.244.66.17 | 63.69.72.43 | HTTP | | | | 1981 | 1 | moshebeeri | http | |
| 2176504 | 2011-09-21 01:10:42.700239 | 15.14.63.69.72.43 | 69.244.66.17 | HTTP | | | | 43963 | 4015 | http | gpjc8816 | |
| 2176505 | 2011-09-21 01:10:42.701308 | 15.14.63.69.72.43 | 69.244.66.17 | HTTP | | | | 45423 | 4015 | http | gpjc8816 | |
| 2176506 | 2011-09-21 01:10:42.701355 | 8.28.63.69.72.43 | 69.244.66.17 | HTTP | | | | 46197 | 4015 | http | gpjc8816 | |
| 2176511 | 2011-09-21 01:10:42.703725 | 15.14.69.244.66.17 | 63.69.72.43 | HTTP | GET | /id/28644474/?agency | | 5475 | 46197 | gpjc8816 | http | ww |

Fig. 1C-2

| | | | | | | | | | |
|---|---|---|---|---|---|---|---|---|---|
| 2176512 | 2011-09-21 01:10:42.703737 | HTTP | | | 580 | 69.244.66.17 | 63.69.72.43 | 6001 | 46197 | gbjo816 | http | |
| 2176514 | 2011-09-21 01:10:42.704987 | HTTP | GET | /id/39935062/ | 2034 | 69.244.66.17 | 63.69.72.43 | 1981 | 1 | dict | http | www.msnb |
| 2176515 | 2011-09-21 01:10:42.705618 | HTTP | GET | /id/40667309/ | 2034 | 69.244.66.17 | 63.69.72.43 | 1981 | 1 | sitaraserver | http | www.msnb |
| 2176520 | 2011-09-21 01:10:42.710006 | HTTP | GET | /id/40667316/ | 2034 | 69.244.66.17 | 63.69.72.43 | 1981 | 1 | sitaradir | http | www.msnb |
| 2176522 | 2011-09-21 01:10:42.711286 | HTTP | GET | /id/40667311/ | 1514 | 63.69.72.43 | 69.244.66.17 | 1461 | 1 | sitaramgmt | http | |
| 2176523 | 2011-09-21 01:10:42.711303 | HTTP | | | 574 | 69.244.66.17 | 63.69.72.43 | 1981 | 1 | sitaramgmt | http | www.msnb |
| 2176530 | 2011-09-21 01:10:42.720302 | HTTP | | | 889 | 63.69.72.43 | 69.244.66.17 | 816 | 1981 | http | dict | |
| 2176531 | 2011-09-21 01:10:42.722154 | HTTP | | | 989 | 63.69.72.43 | 69.244.66.17 | 47132 | 6001 | http | gbjo816 | |
| 2176533 | 2011-09-21 01:10:42.725522 | HTTP | GET | /id/40667313/ | 2034 | 69.244.66.17 | 63.69.72.43 | 3961 | 816 | dict | http | www.msnb |
| 2176534 | 2011-09-21 01:10:42.724169 | HTTP | | | 1514 | 63.69.72.43 | 69.244.66.17 | 1461 | 1981 | http | sitaraserver | |
| 2176535 | 2011-09-21 01:10:42.724248 | HTTP | | | 1514 | 63.69.72.43 | 69.244.66.17 | 2921 | 1981 | http | sitaraserver | |
| 2176536 | 2011-09-21 01:10:42.724302 | HTTP | | | 1514 | 63.69.72.43 | 69.244.66.17 | 4381 | 1981 | http | sitaraserver | |
| 2176537 | 2011-09-21 01:10:42.724352 | HTTP | | | 1514 | 63.69.72.43 | 69.244.66.17 | 5841 | 1981 | http | sitaraserver | |
| 2176540 | 2011-09-21 01:10:42.724468 | HTTP | | | 1016 | 63.69.72.43 | 69.244.66.17 | 963 | 1981 | http | sitaradir | |
| 2176542 | 2011-09-21 01:10:42.725262 | HTTP | GET | /id/40667314/ | 1514 | 69.244.66.17 | 63.69.72.43 | 7461 | 47132 | gbjo816 | http | www.msnb |
| 2176543 | 2011-09-21 01:10:42.725274 | HTTP | | | 574 | 69.244.66.17 | 63.69.72.43 | 7981 | 47132 | gbjo816 | http | |
| 2176546 | 2011-09-21 01:10:42.727549 | HTTP | GET | /id/41318972/ | 2034 | 69.244.66.17 | 63.69.72.43 | 3961 | 963 | sitaradir | http | www.msnb |
| 2176549 | 2011-09-21 01:10:42.730971 | HTTP | | | 1319 | 63.69.72.43 | 69.244.66.17 | 1266 | 1981 | http | sitaramgmt | |
| 2176552 | 2011-09-21 01:10:42.734828 | HTTP | GET | /id/23297925/ | 2034 | 69.244.66.17 | 63.69.72.43 | 3961 | 1266 | sitaramgmt | http | www.msnb |
| 2176554 | 2011-09-21 01:10:42.740247 | HTTP | | | 1514 | 63.69.72.43 | 69.244.66.17 | 7301 | 1981 | http | sitaraserver | |

Fig. 1C-3

| | | | | | | | | |
|---|---|---|---|---|---|---|---|---|
| 2176555 | 2011-09-21 01:10:42.740307 | 1514:63.69.72.43 | 69.244.66.17 | HTTP | | | 8761 | 1980 http sitaraserver |
| 2176556 | 2011-09-21 01:10:42.740357 | 1514:63.69.72.43 | 69.244.66.17 | HTTP | | | 9698 | 1981 http sitaraserver |
| 2176558 | 2011-09-21 01:10:42.741239 | 991:63.69.72.43 | 69.244.66.17 | HTTP | | | 1612 | 3961 http dict |
| 2176560 | 2011-09-21 01:10:42.742299 | 850:63.69.72.43 | 69.244.66.17 | HTTP | | | 48140 | 7980 http gbjd816 |
| 2176561 | 2011-09-21 01:10:42.742593 | 1062:63.69.72.43 | 69.244.66.17 | HTTP | GET | /d/23191536 | 3960 | 9698 sitaraserver http www.msnbc |
| 2176563 | 2011-09-21 01:10:42.744564 | 2033:69.244.66.17 | 63.69.72.43 | HTTP | GET | /d/33589610 | 5940 | 1612 dict http www.msnbc |
| 2176564 | 2011-09-21 01:10:42.744994 | 1445:63.69.72.43 | 69.244.66.17 | HTTP | | | 2354 | 3961 http sitaradir |
| 2176565 | 2011-09-21 01:10:42.746078 | 2048:69.244.66.17 | 63.69.72.43 | HTTP | GET | /d/33589568 | 9975 | 48140 gbjd816 http www.msnbc |
| 2176566 | 2011-09-21 01:10:42.747879 | 2040:69.244.66.17 | 63.69.72.43 | HTTP | GET | /d/23284290?LNW.js | 5947 | 2354 sitaradir http ww |
| 2176568 | 2011-09-21 01:10:42.750043 | 1514:63.69.72.43 | 69.244.66.17 | HTTP | | | 2726 | 3961 http sitaramgmt |
| 2176569 | 2011-09-21 01:10:42.751435 | 1449:63.69.72.43 | 69.244.66.17 | HTTP | | | 4121 | 3961 http sitaramgmt |
| 2176571 | 2011-09-21 01:10:42.754241 | 2033:69.244.66.17 | 63.69.72.43 | HTTP | GET | /d/42382693 | 5940 | 4121 sitaramgmt http www.msnbc |
| 2176574 | 2011-09-21 01:10:42.759409 | 1514:63.69.72.43 | 69.244.66.17 | HTTP | | | 11158 | 3960 http sitaraserver |
| 2176575 | 2011-09-21 01:10:42.760276 | 1137:63.69.72.43 | 69.244.66.17 | HTTP | | | 12241 | 3960 http sitaraserver |
| 2176577 | 2011-09-21 01:10:42.760455 | 1514:63.69.72.43 | 69.244.66.17 | HTTP | | | 3072 | 5940 http dict |
| 2176579 | 2011-09-21 01:10:42.761299 | 1514:63.69.72.43 | 69.244.66.17 | HTTP | | | 4532 | 5940 http dict |
| 2176580 | 2011-09-21 01:10:42.761416 | 1035:63.69.72.43 | 69.244.66.17 | HTTP | | | 5513 | 5940 http dict |
| 2176581 | 2011-09-21 01:10:42.761449 | 299:63.69.72.43 | 69.244.66.17 | HTTP | | | 48385 | 9975 http gbjd816 |
| 2176583 | 2011-09-21 01:10:42.763645 | 2033:69.244.66.17 | 63.69.72.43 | HTTP | GET | /d/24472559 | 5939 | 12241 sitaraserver http www.msnbc |
| 2176585 | 2011-09-21 01:10:42.764846 | 1514:63.69.72.43 | 69.244.66.17 | HTTP | | | 3814 | 5947 http sitaradir |

Fig. 1C-4

| | | | | | | | | |
|---|---|---|---|---|---|---|---|---|
| 2176586 | 2011-09-21 01:10:42.765823 | 1514 | 63.69.72.43 | 69.244.66.17 | HTTP | | | |
| 2176587 | 2011-09-21 01:10:42.765886 | 586 | 63.69.72.43 | 69.244.66.17 | HTTP | | 5274 | 5947 http sitaradir |
| 2176589 | 2011-09-21 01:10:42.766076 | 2050 | 69.244.66.17 | 63.69.72.43 | HTTP | GET /default.ashx?id/23016591 | 5806 | 5947 http sitaradir |
| 2176593 | 2011-09-21 01:10:42.769364 | 1351 | 63.69.72.43 | 69.244.66.17 | HTTP | | 11971 | 48385 gbjd816 http |
| 2176596 | 2011-09-21 01:10:42.781381 | 887 | 63.69.72.43 | 69.244.66.17 | HTTP | | 5418 | 5940 http sitaramgmt |
| 2176597 | 2011-09-21 01:10:42.782265 | 1056 | 63.69.72.43 | 69.244.66.17 | HTTP | | 13074 | 5939 http sitaraserver |
| 2176599 | 2011-09-21 01:10:42.794884 | 499 | 63.69.72.43 | 69.244.66.17 | HTTP | | 49387 | 11971 http gbjd816 |
| 2176639 | 2011-09-21 01:10:42.984761 | 1351 | 63.69.72.43 | 69.244.66.17 | HTTP | | 436 | 1981 http moshebeeri |
| 2176642 | 2011-09-21 01:10:42.995540 | 586 | 63.69.72.43 | 69.244.66.17 | HTTP | | 5418 | 5940 http sitaramgmt |
| 2176643 | 2011-09-21 01:10:42.995587 | 887 | 63.69.72.43 | 69.244.66.17 | HTTP | | 5806 | 5947 http sitaradir |
| 2176648 | 2011-09-21 01:10:42.999887 | 1056 | 63.69.72.43 | 69.244.66.17 | HTTP | | 13074 | 5939 http sitaraserver |
| 2176655 | 2011-09-21 01:10:43.010042 | 499 | 63.69.72.43 | 69.244.66.17 | HTTP | | 49387 | 11971 http gbjd816 |
| 2176710 | 2011-09-21 01:10:43.196873 | 2051 | 69.244.66.17 | 63.69.72.43 | HTTP | GET /databox/data.aspx?dbid=23283610&s=100 | 436 | 1981 http moshebeeri |
| 2176711 | 2011-09-21 01:10:43.199894 | 2046 | 69.244.66.17 | 63.69.72.43 | HTTP | GET /databox/data.aspx?dbid=23301549&s=8 | 13968 | 49387 gbjd816 http |
| 2176761 | 2011-09-21 01:10:43.296907 | 1514 | 63.69.72.43 | 69.244.66.17 | HTTP | | 7931 | 13074 sitaraserver http |
| 2176762 | 2011-09-21 01:10:43.297921 | 941 | 63.69.72.43 | 69.244.66.17 | HTTP | | 50847 | 13968 http gbjd816 |
| 2176789 | 2011-09-21 01:10:43.349604 | 1139 | 63.69.72.43 | 69.244.66.17 | HTTP | | 51734 | 13968 http gbjd816 |
| 2176865 | 2011-09-21 01:10:44.307801 | 2033 | 69.244.66.17 | 63.69.72.43 | HTTP | GET /id/39729002 | 14159 | 7931 http sitaraserver |
| 2176868 | 2011-09-21 01:10:44.326406 | 523 | 63.69.72.43 | 69.244.66.17 | HTTP | | 9910 | 14159 sitaraserver http www.msnbc |
| 2176892 | 2011-09-21 01:10:44.475671 | 2111 | 69.244.66.17 | 63.69.72.43 | HTTP | GET /proxy/Proxy.asmx/GetDictionaryItem?do | 14628 | 9910 http sitaraserver |
| | | | | | | | 11957 | 14628 sitaraserver http |

Fig. 1C-5

| | | | | | | | |
|---|---|---|---|---|---|---|---|
| 2176994 | 2011-09-21 01:10:44.496647 | | 64 | 63.69.72.43 | 69.244.66.17 | HTTP | | | 15215 | 11957 | http | sitaraserver | |
| 2177064 | 2011-09-21 01:10:44.747148 | | 2033 | 69.244.66.17 | 63.69.72.43 | HTTP | GET /id/3973037 2 | | 13946 | 15215 | sitaraserver | http | www.msnbc |
| 2177065 | 2011-09-21 01:10:44.766395 | | 64 | 63.69.72.43 | 69.244.66.17 | HTTP | | | 15215 | 11957 | http | sitaraserver | |
| 2177070 | 2011-09-21 01:10:44.777491 | | 524 | 63.69.72.43 | 69.244.66.17 | HTTP | | | 15685 | 13946 | http | sitaraserver | |
| 2226106 | 2011-09-21 01:25:36.062875 | | 1962 | 69.244.66.17 | 63.69.72.43 | HTTP | GET /bannerfarm/189078/epcplayaasep11_9.8. | | 1909 | 1 | spw-dialer | http | |
| 2226109 | 2011-09-21 01:25:36.077559 | | 1514 | 63.69.72.43 | 69.244.66.17 | HTTP | | | 1461 | 1909 | http | spw-dialer | |
| 2226110 | 2011-09-21 01:25:36.078474 | | 1514 | 63.69.72.43 | 69.244.66.17 | HTTP | | | 2921 | 1909 | http | spw-dialer | |
| 2226111 | 2011-09-21 01:25:36.078568 | | 1514 | 63.69.72.43 | 69.244.66.17 | HTTP | | | 4381 | 1909 | http | spw-dialer | |
| 2226112 | 2011-09-21 01:25:36.078612 | | 1514 | 63.69.72.43 | 69.244.66.17 | HTTP | | | 5841 | 1909 | http | spw-dialer | |
| 2226115 | 2011-09-21 01:25:36.090515 | | 1514 | 63.69.72.43 | 69.244.66.17 | HTTP | | | 7301 | 1909 | http | spw-dialer | |
| 2226116 | 2011-09-21 01:25:36.091503 | | 1514 | 63.69.72.43 | 69.244.66.17 | HTTP | | | 8761 | 1909 | http | spw-dialer | |
| 2226117 | 2011-09-21 01:25:36.091589 | | 1514 | 63.69.72.43 | 69.244.66.17 | HTTP | | | 10221 | 1909 | http | spw-dialer | |
| 2226119 | 2011-09-21 01:25:36.095316 | | 1514 | 63.69.72.43 | 69.244.66.17 | HTTP | | | 11681 | 1909 | http | spw-dialer | |
| 2226121 | 2011-09-21 01:25:36.096318 | | 1514 | 63.69.72.43 | 69.244.66.17 | HTTP | | | 13141 | 1909 | http | spw-dialer | |
| 2226122 | 2011-09-21 01:25:36.096397 | | 1514 | 63.69.72.43 | 69.244.66.17 | HTTP | | | 14601 | 1909 | http | spw-dialer | |
| 2226124 | 2011-09-21 01:25:36.102662 | | 1514 | 63.69.72.43 | 69.244.66.17 | HTTP | | | 16061 | 1909 | http | spw-dialer | |

SYSTEM AND METHOD FOR DISCRIMINATING REMOTE SITE ORIGINATION OF COMMUNICATION SIGNALS TRANSMITTED THROUGH A NETWORK BASED ON ENVELOPE CHARACTERISTICS

RELATED APPLICATION DATA

This Application is based on Provisional Patent Application No. 61/553,944, filed 31 Oct. 2011.

BACKGROUND OF THE INVENTION

The present invention is directed to a system and method for discriminating the actual origination of communication signals transmitted through a network interconnection. More specifically, the system and method are directed to the processing of communication signals received at a local, or reference, site through a network interconnection to determine and/or uniquely characterize the remote site origination of such communication signals. The system and method provide for this determination and/or unique characterization in a manner that is signal payload-, or data content- agnostic manner. They do so by, among other things, ascertaining the envelope characteristics of the communication signals in question and classifying based thereon the remote site from which the signals originated.

In certain embodiments and applications, the system and method provide for such classification of remote site origin in data content-agnostic manner for communication signals transmitted from certain websites remotely accessed by a local site through the internet, namely the world wide web. In these embodiments and applications, the system and method exploit the fact that signal transmissions in certain widely employed communication protocols pass the signals in packetized data segments. Various envelope characteristics are defined by the sequence(s) of packetized data segments transmitted to the local site during particular interconnected sessions. One or more characteristic signatures may be obtained according to these envelope characteristics, so as to uniquely characterize the particular remote site originating the data segments.

There are many instances where it is desirable to know what particular website or web-service originated certain communication signals that have been received by remote access over a network, even when the address of that website or service is dynamic or is obscured for example by NAT (network address translation) or proxy forwarding. In some instances it is desirable to recognize more specifically when a particular type of session is occurring over a network— say, the use of a particular web form, transfer of data from a particular application, or the occurrence of malicious software activities over the network. Where a site in question is uncooperative with the monitoring measures in place, is deliberately evasive to such monitoring, or is particularly sensitive to privacy concerns, the site may employ encryption measures in the given communication channel to make it difficult or impractical to determine its identity based on the payload of data. Even in cases where clear-channel data is readily accessible, it may become computationally challenging to store and process necessary data signatures when there are potentially many cases of interest. Thus, there is a need for a compact, fast, and minimally invasive approach to identifying remote sites such as websites or web-services accessed through a network.

Applications of such include detection for security purposes. These include monitoring of user activities for consistency with a business or government purpose without violation of their privately encrypted data. It is desirable to detect instances when users are redirected to malicious websites, masquerading as real commercial counterparts. It is also desirable to discover cases in which malicious software on a computer communications with outside entities; in particular, where such communications may be masked as benign web traffic such as web browsing, and where such outside servers may operate behind changing apparent web addresses on order to evade detection.

SUMMARY OF THE INVENTION

It is an object of the present invention to provide a system and method for automatically and accurately distinguishing the sources from which communication signals passed through a network interconnection originate.

It is another object of the present invention to provide a system and method for automatically and accurately discriminating sources of communication signals passed through a network interconnection in data content-agnostic manner.

It is yet another object of the present invention to provide a system and method for automatically and accurately identifying and classifying the remote sites which actually originate communication signals passed through a network interconnection to a local, or reference, site based on envelope information ascertained from the communication signals.

These and other objects are attained by a system formed in accordance with certain embodiments of the present invention for distinguishing between a plurality of remote sites accessed through a network interconnection by a reference site based upon envelope characteristics of communication signals transmitted therebetween. The system comprises a capture unit time-capturing a plurality of segments of the communications signals transmitted during an interconnected session established between one of the remote sites and the reference site. A parsing unit is coupled to the capture unit to selectively generate for each of the interconnected remote sites an envelope signal indicative of at least one resource allocation response thereof during the interconnection session. The envelope signal is defined by values of at least a first predetermined envelope parameter acquired from the time-captured segments. A signature unit is coupled to receive the envelope signal from the parsing unit for each interconnected remote site to be identified, the signature unit establishing responsive to the envelope signal a characteristic signature for uniquely identifying the interconnected remote site. Newly-captured communication signal segments may be classified thereby in their remote site origination based on the characteristic signatures of identified remote sites.

A method formed in accordance with certain embodiments of the present invention provides for distinguishing between a plurality of remote sites accessed through a network interconnection by a reference site based upon envelope characteristics of communication signals transmitted therebetween. The method comprises time-capturing a plurality of segments of the communications signals transmitted during an interconnected session established between one of the remote sites and the reference site. The method also comprises parsing the time-captured segments to selectively generate for each the interconnected remote sites an envelope signal indicative of at least one resource allocation response thereof during the interconnection session, the envelope signal being defined by values of at least a first predetermined envelope parameter acquired from the time-captured segments. A characteristic signature is established for each interconnected remote site to be identified responsive to the envelope signal generated, which characteristic signature uniquely identifies the interconnected remote site. Newly-captured communication signal segments are thereby classified in remote site origination based on the characteristic signatures of identified remote sites.

A system formed in accordance with certain other embodiments of the present invention provides for discriminating remote site origination of communication signals received by a reference site from a site remotely accessed through a network interconnection, based upon envelope characteristics of the transmitted communication signals. The system comprises a capture unit time-capturing a plurality of segments of the communications signals transmitted during an interconnected session established between one of the remote sites and the reference site. The system also comprises a parsing unit coupled to the capture unit to selectively generate for each of the interconnected remote sites an envelope signal indicative of at least one resource allocation response thereof during the interconnection session. The envelope signal is defined by values of at least a first predetermined envelope parameter acquired from the time-captured segments; and, for each remote site having a resource allocation response accessing multiple resources, the parsing unit generates a plurality of envelope sub-signals each corresponding to one accessed resource. The envelope signal thereby includes a concatenation of envelope sub-signals one with the other. The system further comprises a signature unit coupled to receive the envelope signal from the parsing unit for each interconnected remote site to be identified. The signature unit establishes responsive to the envelope signal a characteristic signature for uniquely identifying the interconnected remote site, such that newly-captured communication signal segments may be thereby classified in remote site origination based on the characteristic signatures of identified remote sites. A classifier unit is coupled to receive from the parsing unit the envelope signal generated thereby for newly-captured communication signal segments from an interconnection session established between an unidentified remote site and the reference site. The classifier unit classifies the newly-captured communication signal segments in remote site origination responsive to comparison of the envelope signal thereof with the characteristic signatures of identified remote sites.

BRIEF DESCRIPTION OF THE DRAWINGS

Figure 1A:
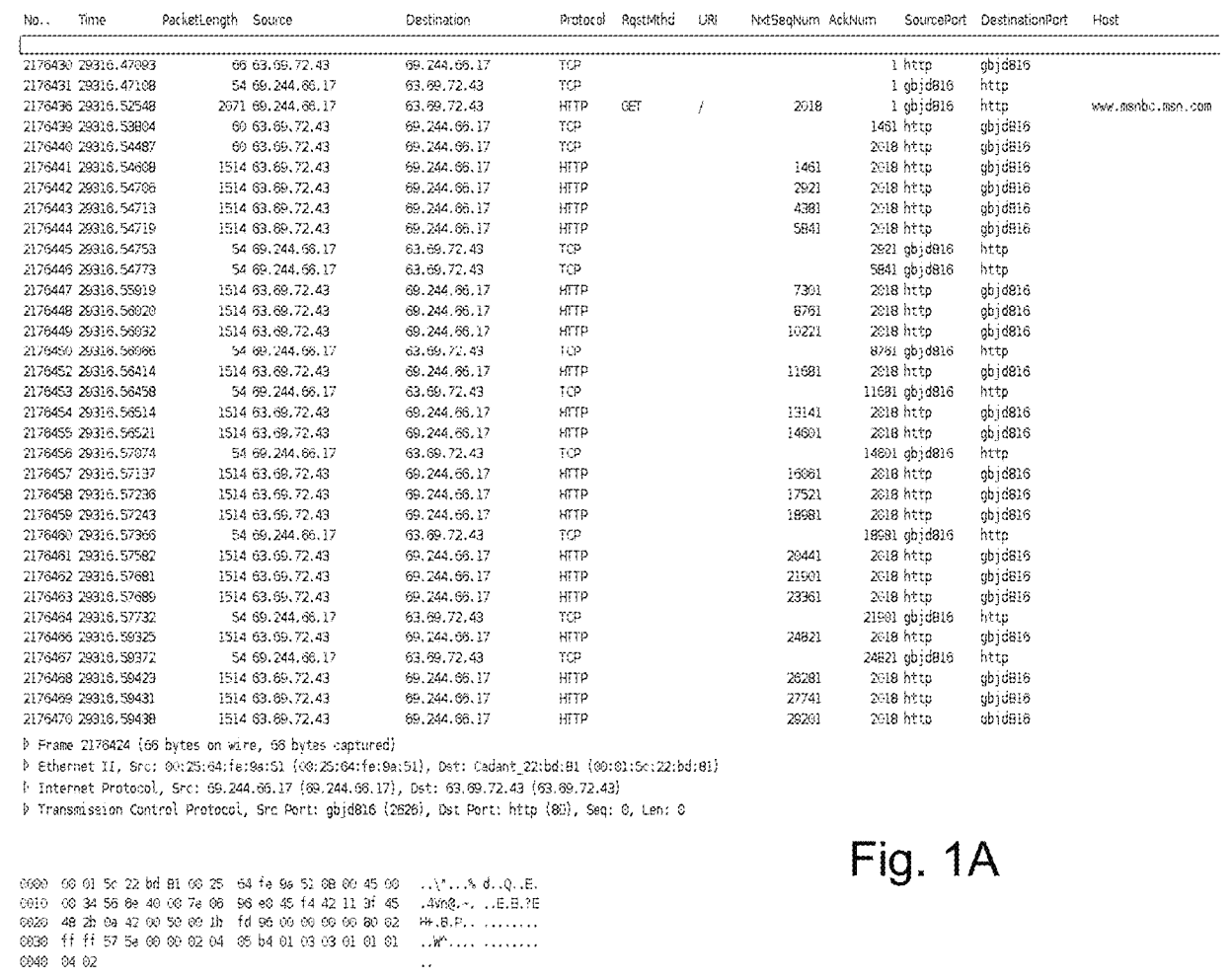

FIG. 1A is an illustrative example of data segments time-captured from packets of communication signal transmissions between local/reference and remote sites through a network interconnection in accordance with an exemplary embodiment of the present invention, tabulated in sequence;

FIG. 1C is a longer, slightly modified version of the tabulated listing of time-captured data segments shown in the example of FIG. 1A;

DETAILED DESCRIPTION OF THE PREFERRED EMBODIMENTS

Figure 1B:
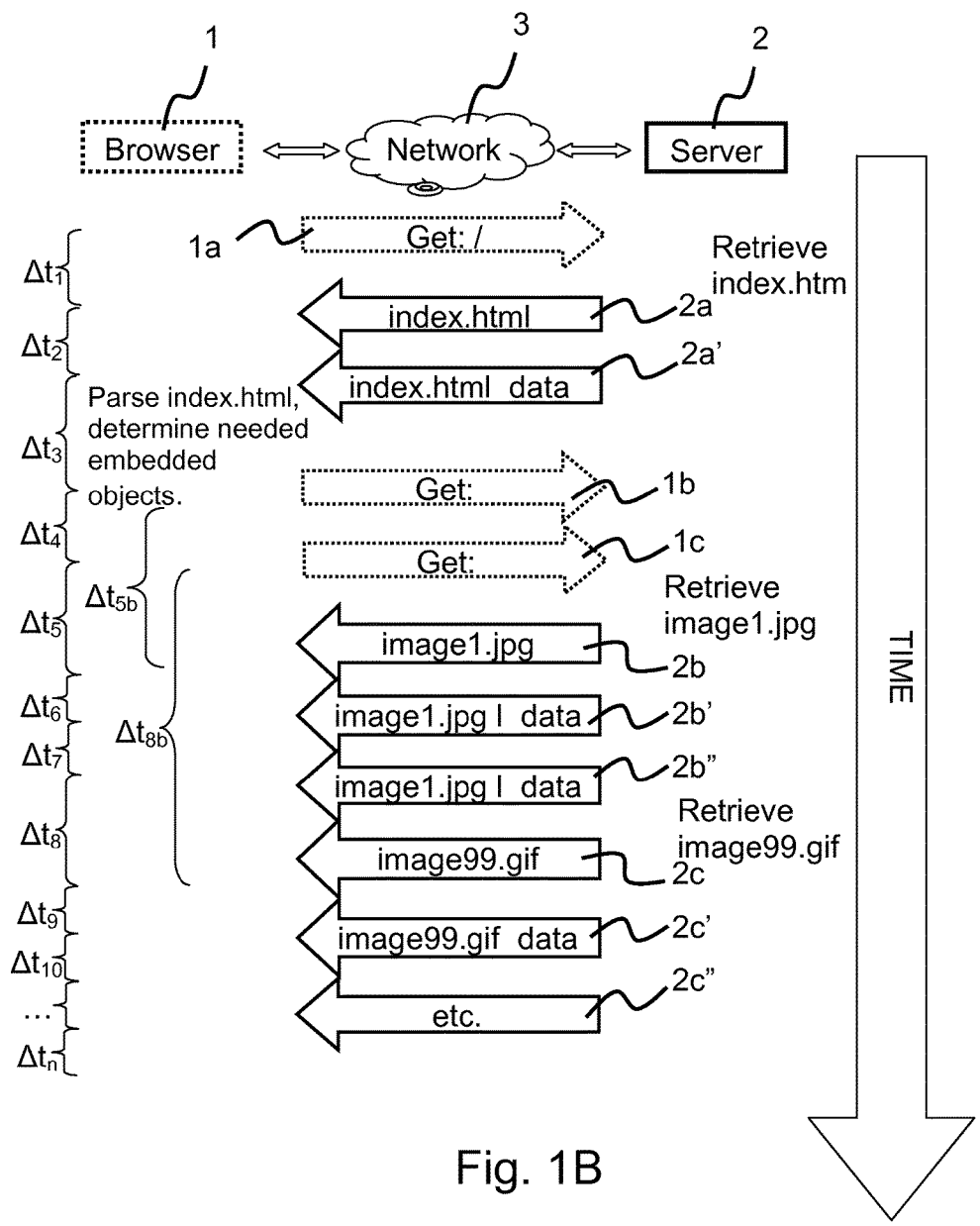
FIG. 1B is a schematic diagram illustrating the timing of packet transfers during one example of an interconnect session between a browser and server through a network.

The present invention is directed to the fields of signal processing and data processing, of signature detection, and of computer networks. In the exemplary embodiments disclosed, it is illustratively directed to the blind identification of a website or other Internet Protocol (IP) network connected service or server by characteristics of the IP packet chain other than the content of the data fields of the packets. For example, a system and method implemented in accordance with such embodiments of the present invention may be used to track and identify instances of access to a particular website or web-connected service even when that website is duplicated for counterfeit purposes at different web addresses, is moved, or is hidden behind a proxy service. The system and method address enable the quick and efficient identification of a remote site of interest without the necessity and memory cost of extensively evaluating and comparing actual data payloads of communication signals originating from that site. Suitable applications include but are not limited to:

detecting illicit or hostile web services masquerading at different web addresses;
  detecting malware contacts emanating out of a local network to the internet;
  rapidly screening and detecting an individual's access to unauthorized sites or site types through a network when such access is masked via encoding or proxy services;

detecting predefined types of sessions that are conducted over a secure channels without requiring decoding or other access to payload data; and, detecting use of mobile or desktop applications via their IP transmission patterns.

Briefly, the subject system and method serve toward these and other ends to reliably ascertain the originating sites of communication signals received by a local site over a network, such as the world wide web. The system and method do so in a manner that obviates the need to read or otherwise process the actual contents of the data carried by the signals. In other words, the system and method serve to accurately classify the identity of the remote site which originated a given set of communication signals received in data content agnostic manner.

As used herein, the term "local site" is used primarily for referential purposes. It denotes a reference site with respect to which another "remote" site accessible through a network interconnection may be, operationally at least, remotely disposed. The term "local site" does not necessarily denote a physical site, nor even a site within close physical proximity to a user or other peripheral equipment utilized by the user nonetheless accessing the network through that site. Nor does the term "local site" necessarily mean that a system or method implemented in accordance with the present invention is actually disposed at that site. As described in following paragraphs, such local site may be established physically or virtually using any suitable hardware and/or software measures known in the art.

Remotely disposed but selectively accessible sites of an interconnecting network are typically configured to respond in particular programmed manner when engaged in an interconnection session by another site. In the exemplary case of the internet, as implemented via the world wide web, the remote sites are established as individually accessible websites. When accessed, a website operates much as a server which responds to a client (typically, the local client initiating the access), allocating to the client access to various resources to, for instance, view and navigate through one or more of its web pages. Inasmuch as each web page is typically custom configured in the design of its content, the sequence of responsive actions necessarily undertaken to establish the page for the accessing client is distinctly configured. Such responsive actions typically include the suitable allocation of resources such as text, images, and links to other sites or resources for the accessing client.

In certain applications, the local site may itself be a website or a user platform coupled to the world wide web through a website or other interconnection service providing intermediary. Local sites interconnected by such intermediary include, for example, a mobile communication device programmably configured to access the subject system and method implemented in certain embodiments as an online application executable thereon.

In certain applications, local physical devices may also provide user accessible websites as a means to configure the device or communicate with it. Examples include IP routers and Ethernet enabled cameras which include embedded web server configuration and data exchange pages.

The disclosed example is directed, without limitation, to the identification of websites originating certain communication signals passed through the world wide web. Identification of other web-or network-based transactions may be similarly accomplished in accordance with the present invention, with only minor differences occurring in the nature of the labeling of integrations and signal-subcomponents.

Websites on the world wide web communicate according to one or more communication protocols such as, for example, the widely used Hypertext Transfer Protocol (HTTP). They do so, passing communication signals in bursts, or packets, of data transmitted according to the Transmission Control Protocol/Internet Protocol (TCP/IP), with accessible resources of each website each identified by a unique Universal Resource Identifier (URI). The sequence(s) of responsive actions taken in this context to allocate resources for accessing clients tends to be distinctive for individual websites. In a typical HTTP client-server transaction, the accessed server responds to a client "GET" request for a particular URI with a sequence of data segment transmissions to the client. The response often includes a series of such data segment (or packet) transmission sequences, one for each URI allocated to the client to fulfill a set of related requests within the given HTTP transaction.

For example, where a local site accesses a certain website, a client "GET" request for the URI "I" for a particular web page of the site prompts a sequence of data packet transmissions to establish all or a portion of the web page in question. One or more subsequent "GET" requests may follow to further populate the webpage, for instance, with images or the like identified by corresponding URI's. Those subsequent "GET" requests each entail their own sequence of data packet transmissions suitable for the specific nature of the URI thus allocated. A user at the client, or local site, may then display the web page locally and interact with the originating website therethrough.

Obviously, the need for authentication of the website is of paramount importance, especially where personal, financial, and other sensitive information is shared by a user at a local site with that remote website. While a plethora of authentication and other counter measures are known to combat internet fraud, the growing sophistication of fraudulent sites makes their detection using conventional web page or other data content based measures increasingly difficult. In accordance with certain aspects of the present invention, detection of fraudulent sites is aided enormously by remote site classification measures based on envelope characteristics of communication signals as transmitted by the originating websites.

As used herein, "payload data" refers to the data contents of network traffic, the conveyance of which is the primary purpose of said network traffic. This is distinguished from "envelope data" as used herein, which relates to certain attributes of the network traffic meant to ensure the successful transmission of the payload data to the proper destination. In exemplary applications employing packet transmissions, for instance, envelope data may include a certain part(s) of a packet or packet frame that serves to enable the successful transmission and routing of said packets which carry said payload data.

Preferably, the packets of communications data transmitted by an interconnected website (to a local site) are acquired in time-captured segments which are tabulated according to certain attributes inherently defined in each packet by the communications protocol employed. In the disclosed example, these attributes include such parameters as time-stamps, packet length, source and destination address, source and destination port, request method (such as a "GET" command), URI, and the like. One or more of these tabulated attributes may be selected for use as an envelope parameter by which to 'fingerprint'—or characterize the unique signature of—the website actually originating the locally received communications data packets, irrespective of their payload content. In addition to the directly encoded envelope data, the exemplary embodiment disclosed preferably instruments the timing of the packet stream and records the time at which each packet is captured.

By ascertaining the values of each envelope parameter across the sequentially time-captured data segments may then yield an effective waveform distinguishing the response pattern of one website from that of other websites. Since the web-pages of each website are custom designed and programmably implemented, the response patterns of different websites will vary considerably, although one envelope parameters may provide greater discriminating strength than another. One or more envelope parameters, or combinations thereof, may be suitably selected for use in generating one or more effective waveforms as envelope signals from which a characteristic signature(s) may be derived for the originating website.

In accordance with certain aspects of the present invention, the system and method are implemented to operate in at least a training mode on the one hand, and in a classification mode on another. In the training mode, the characteristic signatures of different websites are generated and stored in this manner. The known characteristic signatures may be updated and refined as more samples of communication signal transmissions in further interconnection sessions with known websites are acquired and processed in the manner disclosed herein. In the classification mode, newly-acquired communication signals may be classified as to their actual website origination, in view of characteristic signatures for known websites. In certain embodiments, these training and classification modes may be switched between rapidly, providing a seamless integration between learning new host sites and verifying against previously visited sites.

As a result of classification, the newly-acquired communication signals may for example be associated with one of the known websites, at which point this fact is preferably confirmed for the local site, and the envelope signals generated for the newly-acquired signals are used to further refine the characteristic signature of that known website. Alternatively, the newly-acquired communication signals may be determined to originate from a website not yet known by a characteristic signature. This fact, too, is preferably communicated to the local site for either detection of a fraudulent site or identification/recordation as another website known by characteristic signature (depending on the application-specific context and circumstances under which the newly-acquired communication signals were received).

Where more than one resource (URI) is allocated to a client during an interconnection session, multiple sequences of time-captured segments are available for use in generating an envelope signal. The envelope parameter values across one sequence of segment time-captured for each resource (URI) are ascertained then to generate an envelope sub-signal (for each envelope parameter/parameter combination selected). The multiple envelope sub-signals resulting from the sequence of time-captured data segments for each URI are concatenated one with the other to collective form the envelope signal pertaining to each selected envelope parameter (or parameter combination). This envelope signal is then used to either newly formulate or refine an existing characteristic signal, or to classify the data segments in actual website origination with respect to characteristic signatures of known websites that have been prestored.

FIGS. 1A-1B and 2A-2B relate to a system 10 implemented in accordance with an exemplary embodiment of the present invention. System 10 provides a methodology which establishes and extracts patterns that occur in IP ("Internet Protocol") or other data traffic of packetized format during access to a website (including a web service provided through a particular site), and uses such patterns to identify subsequent access to the same. This methodology is independent of both the sending and receiving web site addresses in the transaction which occurs during access, and does not rely on either decoding or understanding of the transaction's data content. Thus, both in establishing a characteristic signature for a website and in subsequent detection of the characteristic signature, the system preserves privacy of data and may operate on any encrypted channels without need for decoding.

System 10 preferably examines patterns of certain envelope information inherent in the packetized data. In accordance with one exemplary embodiment, the envelope information includes a sequence of time-delta values (i.e., inter-packet delay) between data packets or frames of data packets in a captured series. Alternatively, the envelope information includes a sequence of data payload size values over the captured series of packets (or packet frames). As yet another alternative, the envelope information includes a combination of such values over the captured series of packets or packet frames.

An additional advantage of this approach is that the characteristic signature derived from the resulting envelope signals is extremely compact when compared to the captured streams of actual data. Thus, a relatively small amount of data need be stored and analyzed in order to detect and classify a candidate website. This enables far more rapid screening of large bodies of network traffic, with minimal memory and storage requirements even when many different websites are potentially of interest for detection. The subject system and method thus provide numerous advantages over similarly targeted methods that might employ analysis of the data payloads themselves.

The subject system and method also overcome a significant obstacle to identifying websites found in the varying nature of packet exchanges between local and accessed remote sites. For example, due to buffering, a web browser may have downloaded and recorded data segments pertaining to a particular resource (such as for a .jpg resource allocation response) during a prior interconnect session. When encountering a new request for this same data during a later interconnect session, the web browser will likely perform an abbreviated transaction that omits redundant request and download traffic for the buffered item. Exchanges with the same remote website on different occasions may therefore result in transactions that appear to be quite different due to such omission of different portions of the IP packet exchange depending on the circumstances. In accordance with certain aspects of the present invention, the subject system and method account for the potential mismatch of IP packet exchanges between the same local and remote sites by suitably appending partial length IP packet exchanges where abbreviated web transactions are encountered.

Time-Capture of Data Segments

Figure 2A:
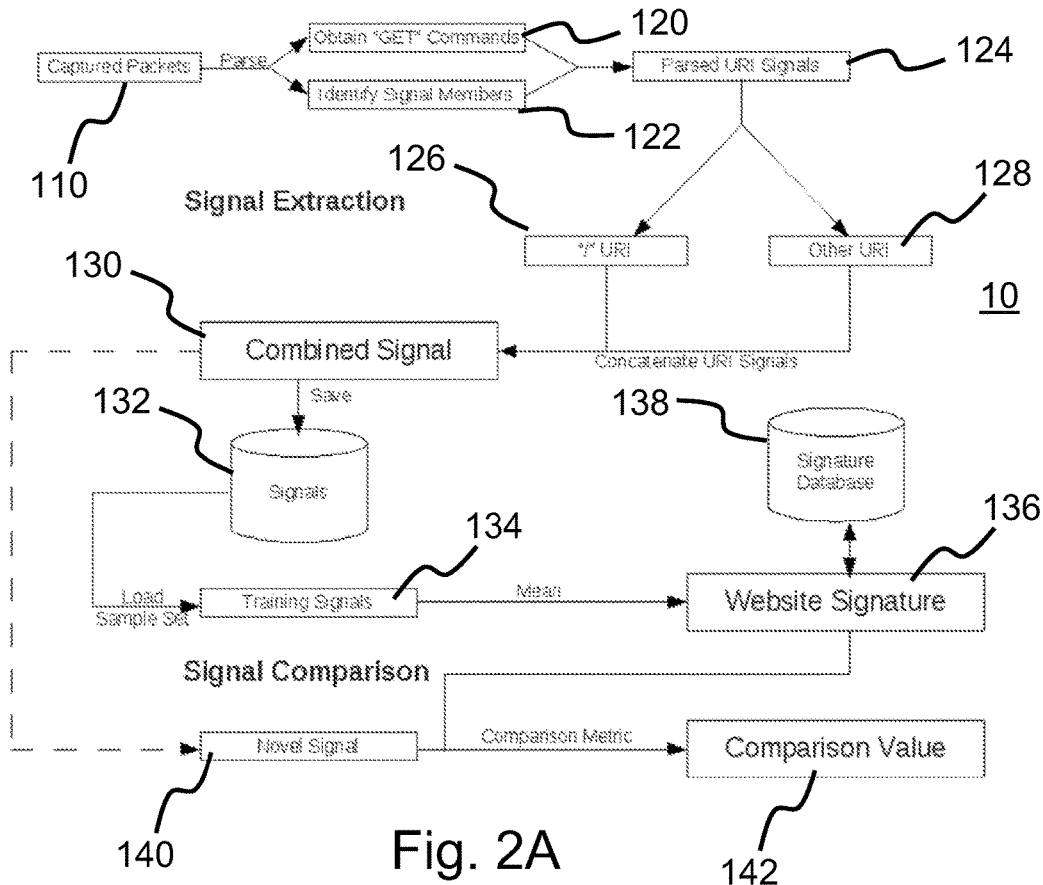
FIG. 2A is a schematic diagram illustrating the flow of processes for training and classification modes of operation in a system formed in accordance with an exemplary embodiment of the present invention.

As illustratively shown in FIG. 2A, system 10 at block 110 reduces the web-traffic packets transmitted during an interconnection session (between local and remote sites) to at least a stored record of packet header data. The system captures trains of packets using any suitable means known in the art, such as open source packages like WIRESHARK or the like, which execute to record web packet data in bulk. FIG. 1A illustrates an example of one such chain of packets, a frame of which is time-captured from a network interconnection as data segments delineated in sequence with their various envelope parameter values/indicia tabulated under correspondingly denoted column headings.

To reduce workload, system 10 preferably pre-filters the packets to those of potential interest for the particular intended application. For example, in the website ID application shown, system 10 filters and retains only those frames (i.e., packet sets) for resource requests and responses predicated on http.request.method===="GET." In the disclosed embodiment, those containing http.request.uri=="/" are subsequently separated from those containing other URI requests, as described in following paragraphs. The packet/frame data retained by system 10 may include, for example such captured parameters as: Time, Packet Size, Source IP, Destination IP, Protocol, Request Method, URI, Next Sequence Number, Acknowledgment Number, Source Port, and Destination Port. Of these data fields, system 10 preferably employs "Packet Size" and "Time" as the envelope parameters most effective for uniquely characterizing a given website. "Packet Number" or any other suitable parameter may be selectively used in alternate embodiments as an envelope parameter of choice. The remaining data fields are referenced in the subsequent parsing of packet sequences into groups for extracting signals.

In the particular list of captured IP packet data segments shown in FIG. 1A, each of the time-captured data segments includes the data fields: packet number, time of receipt, packet length, source IP address, destination IP address, Request Method, URI (where appropriate), Next Seq Number, Ack Number, Source Port, Destination Port, and Host. These fields represent a human readable listing taken from the actual packet stream, and may be encoded in particular fields and format according to any suitable network protocol known in the art.

FIG. 1B schematically illustrates the timing of packet transfers during an interconnect session between a local site (executing a Browser 1, for instance) which as a Client accesses a remote site Server 2 through a network 3. The access occurs according to HTTP, HTTPS, or other web communications protocol. In this particular example, a typical HTML page request is illustrated by the timing and sequence of packet exchanges required to effect and service the request. The browser requests 1a, 1b, 1c are shown in dotted arrows, while the server responses 2a, 2a', 2b, 2b', 2b", 2c, 2c', 2c" are shown in solid arrows. Each arrow represents a transmitted packet of communication data.

Note that, in accordance with known web protocols, in some instances multiple packets may be exchanged where information exceeds the limits of a single packet or is divided due to some other protocol rule. Thus, communications data like the index.html data 2a' may in some cases comprise only one packet, while in others may comprise many packets. The actual number of and labels on packets exchanged shown are simply examples and should not be interpreted to limit this disclosure.

Events shown in FIG. 1B sequence down the page vertically in time, as indicated by the "TIME" arrow 4. Thus, each event appearing further down in the diagram occurs at a time later than the events appearing above it. Activities at either the Browser 1 or the Server 2 are indicated in plain text without arrows around them.

In a typical HTML web page retrieval, as shown here, the first request from the browser 1 is a "GET" of the index page. The "Get:/" is a typically used form, and most web servers 2 will interpret the command as equivalent to for example "GET:/index.html," provided that the referenced file is available. The server 2 then takes responsive action to find and retrieve the referenced file—in this case "index.html"—and transmits the retrieved file back to the browser 1. In this example, a header is transmitted in a first packet 2a, and the body of data in the next packet 2a'. Additional packets (not shown) may be utilized where required by the body of data's length. The Browser 1 then parses the html data, and determines what embedded objects (if any) are required from the server in order to complete local rendering of the page.

In this example, the Browser 1 determines that two embedded images are required. These two files "image1.jpg" and "image99.gif" are therefore requested from the server 2 via packet transmissions 1b, 1c. The server 2 retrieves the first image file and replies with packets corresponding to the header 2b and body of data 2b', 2b" for that first image. The server 2 then proceeds to retrieve the second image file, and replies with additional corresponding packets 2c, 2c', 2c" to the browser. Again, the number of packets in the response may vary across examples, but will typically be highly consistent for a given website across multiple instances of access.

Note that this requirement may vary, even on a static web page. For example, certain browsers will buffer previously used images. Thus, if the same image is referenced again, while the image is still stored locally, the browser will not request it again from the server. In accordance with certain aspects of the present invention, the subject system and method compensate for partial deletions from a website's expected sequence of data transmission due to such omitted retrieval requests. Otherwise, such gaps in data could significantly distort the envelope signature of the page. Also of note is that many web pages change in their embedded data; for example, selecting user specific information, or inserting or changing advertisements in a page. Such dynamic web pages still tend to exhibit strong partial matches to their prior signatures, however, and are recognized well by the subject system and method.

Each data transmission arrow corresponds to a packet, and a packet payload size is available for each. This information is not shown in FIG. 1B, but form the payload size vector illustrated in FIG. 2B. Likewise, there is a measurable time-delta between each of the packets sent and received. These are illustrated in FIG. 1B ($\Delta t_i$), with corresponding intervals shown. Note that these intervals inherently include the aggregate time elapsed for a number of processes, including the time for each packet to propagate via the interconnecting network, the time for each piece of operative software to parse and act on a data packet, and the time for any retrieval actions, and the like that may need to occur. Hence, the sequence of time-deltas preferably used as an envelope parameter effectively encodes numerous aspects of the server 2 data channel and processing hardware.

The example illustrated in FIG. 1B is deliberately simplified for purposes of explanation. Actual browser host exchanges will generally include substantially more packet exchanges, and may include substantially more transactions within each URI transaction. This is reflected in the example of FIG. 1A, where in response to a single "Get: /" command, numerous protocol transaction exchanges occur even in the absence of any additional URI request. These exchanges include enquiries as to the browser and hardware in use, cookies, security certificates, and numerous other operational details, all of which help form the basis of a website's server/browser interaction signature.

FIG. 1C illustrates a longer portion of the captured data segment example illustrated in FIG. 1A. Note, however, that only HTTP traffic is displayed in this tabulation. In this example, in response to the first "Get: /" request by the browser 1, the server 2 returns not just one or two packets of data, but 27 packets of payload size 1514. Each of these packets has an AckNum value of 2018, indicating they are all in response to the same transaction initiated by the "GET" command with SeqNum 2018. After parsing this HTML data, the browser 1 makes a series of further requests for additional embedded objects, starting with "GET: /default.ashx/id/21589549/", etc. Each is followed by response packet traffic from the server 2.

In the exemplary embodiment disclosed, only packet traffic that is in HTTP protocol as illustrated in FIG. 1C are preferably used for purposes of establishing signals and signatures—thus ignoring intervening TCP exchanges for those purposes. The traffic is limited to only that between a particular source and destination IP. However, in certain cases it is meaningful to further limit the traffic to just that between a particular source and destination port. In the disclosed embodiment, each signal collection is further limited to only those URI request responses which match the source port of the initiating "GET:/." Thus, for the data example shown in FIG. 1C, the URI response signals associated with "GET: /id/37631270/" would be omitted, since they are associated with source port "moshebeeri" rather than "gjad816." In fact, a new request from a separate source port would, in the disclosed embodiment, be used to delineate the beginning of a new combined signal, separate from the initial "GET:/" request.

In certain embodiments, information from all data packets exchanged in aggregate may form the basis of the envelope signal vectors which determine website characteristic signatures. In certain other embodiments, only the server-transmitted packets or only the browser-transmitted packets may serve as a preferred basis of such envelope signal vectors for forming and determining the characteristic signatures.

In collecting signals, the preferred embodiment takes the time delta vector T from only the actual packets linked into a URI transaction, after other packets have been filtered out of consideration. This aspect is illustrated in FIG. 1B by the times labeled $\Delta t_{5b}$ and $\Delta t_{8b}$. The sub-signal $T_{im1}$ associated with "GET: /pics/image1.jpg" in that example will take as its first values $T_{im1}=(\Delta t_{5b}, \Delta t_6, \Delta t_7, \ldots)$, while the sub-signal associated with "GET: /pics/image99.gif" in that example will take as its first values $T_{im99}=(\Delta t_{8b}, \Delta t_9, \Delta t_{10}, \ldots)$. This contrasts with other embodiments, which may instead consider the overall sequence $T=(\Delta t_5, \Delta t_6, \Delta t_7, \ldots)$ for purposes of forming envelope signals and signatures.

Referring back to FIG. 1B, the order of packet exchanges may vary depending on the particular application. For example, the Browser 1 may make multiple "GET" requests before the server 2 responds. In that case, the order in which the "GET" requests are served may vary depending on inherent aspects of the Server 2. In other cases, a particular browser 1 may wait for a reply before sending its next "GET" request, as some browsers limit the number of concurrent outstanding requests they permit.

An envelope sub-signal, with reference to FIG. 1B, preferably comprises information derived from one "GET" request and its corresponding replies. Even where envelope sub-signal packets overlap in real-time, they may be parsed and assembled using the NexSeqNum and AckNum fields shown in the captured data segments in FIG. 1A. These reflect a transaction identifier code embedded in each packet intended to identify request and reply packets associated with a transaction. Thus, in certain embodiments of the invention, allowances are preferably made for out-of-order replies, accordingly assembling each sub-signal in view the transaction identifier code.

Moreover, in certain embodiments, the "GET" command associated with each envelope sub-signal may be recorded for reference purposes, so that envelope sub-signals for future transactions may be matched for efficiency to the previously recorded envelope sub-signals. Suitable gaps may also be left where a particular request fails to occur and/or the envelope sub-signals re-ordered to correspond with the order identified when an earlier pre-recorded occurrence of the envelope sub-signal was ascertained.

Note that, at a simplified logical level, the Browser 1 software interacts with the Server 2 software, regardless of the intervening layers (which are not shown). In practice, each browser 1 is typically embedded in a hardware platform, such as a desktop PC, a tablet, a mobile smartphone, or other device. This hardware platform is linked via a local router to a local network. The server 2 software also operates on corresponding server 2 hardware, which again may be any type of physical device. The server 2 may comprise any suitable platform known in the art, ranging from an embedded device interface to a full commercial internet server, including multiple load-balanced instances of the served site. The local network may be linked via a gateway to the world wide web (internet) and thence to the server; or, the server may be disposed on the same local network. There may be a firewall, proxy servers, and any number of complex routings, all of which are encompassed by the term "network" and its variants, as used herein. Such intervening layers may affect the absolute measured timing values used in forming an envelope sub-signal, envelope signal, or signature, but will not materially affect execution of the disclosed system and method, so long as they remain consistently in the path of a data exchange. That is, the precise nature of the data path is immaterial to the operation of the subject system and method.

Still, it is notable in this regard that the network cloud between the two devices may be quite complex. It may include secure tunneling or other layered protocols. The network may also route packets belonging to other web sessions in a manner that overlaps and interleaves with a concurrent web session under consideration. In accordance with certain aspects of the present invention, the disclosed embodiment preferably includes suitable measures to separate one web session from another, in addition to those for extracting envelope signal (signature) information from the captured packet exchanges.

Packet captures may be done on a continuous basis, or in bulk. In the latter case, recordings may often reach millions of packets. Thus, in certain embodiments it will be understood that use of a continuous rolling buffer(s) may be more practical and efficient in the handling of such data. It is typically necessary to reduce the set of captured packets to those salient to the detection process required for the intended application. In the disclosed example which specifically targets website identification (ID), the salient packets are those relating to the sets of GET request initiated from a local site, and the sets of responses to such requests transmitted by a remote site thereby accessed during an interconnection session. The Source and Destination IP address fields of the data segments reflect the bidirectionality of the interaction in a typical session.

Returning to FIG. 1A, the interaction of interest begins in this example with the "GET" command from the local site address (69.244.66.17), to which the remote server (addressed at 63.69.72.43) responds, the local acknowledges, etc. In the illustrated example, TCP protocol packets are part of this interaction interspersed with the HTTP protocol packets the website sends from its server. Taken together either for a fixed time period, or until the session is interrupted, this stream of packets serves as the basis of the envelope signals as described in preceding paragraphs.

In certain embodiments, data segments of only one protocol type may be used to establish signals, while in other embodiments multiple protocols may be leveraged. In preferred embodiments, data segments of all protocols that partake in a given IP packet exchange relevant for detection are included in the captured data. As discussed in following paragraphs, application of the disclosed exemplary embodiment to HTTP website ID applications may discard certain packets from consideration in order to establish a more robust envelope signal to signature comparison, for example relying only on HTTP protocol packets, and only on those which flow between specific source and destination ports.

General System Operation

FIG. 2a illustrates the flow of processes within system 10 in schematic form. At blocks 120, 122, and 124, system 10 parses the time-captured data segments to obtain one or more them into URI-labeled envelope sub-signals which may then be concatenated to generate a combined envelope signal for an envelope parameter. To do this, all "GET" commands are preferably identified in the illustrated example and used to specify the starting point of a signal of interest. They are preferably label by Destination IP Address and URI. Typically (but not always), the initial GET operation preferably but not necessarily refers to the website home page using the "/" URI label. Other initial queries may be keyed upon in like fashion. For example, it may be established from timing and sequence codes that any given browser-side GET operation to a URI address is independent of previous GET operations and therefore constitutes the start of a new interaction session initiated by the user or by software executing on a user machine. In alternate embodiments where network processes are not HTML (HyperText Markup Language) website-based may be accommodated by adapting the system and method exemplified herein to the known base interaction characteristics and protocols of the network process of interest. In certain embodiments, the interaction process and the start keys may be learned by example and training.

Once the "GET" command data segments are identified, the other captured data segments are scanned for correspondence in Acknowledgment (Ack) Number, IP Addresses, and Ports to identify the data segments for packets constituting the remote site's response to a particular "GET" command. The envelope data properties (e.g., time and payload size) of interest are then gathered to generate a URI-tagged sub-signal for each response following a "GET" command. The "Parsed URI Signals" which result are indicated at block 124.

In the illustrated example, the "GET" command at packet number "2176436" represents the initiation of a resource allocation request, and the subsequently listed data segments represent the sequence of programmed actions taken by the accessed remote site in response. The sequence of these subsequent data segments comprise the source data from which an envelope "signal" (or sub-signal where data segments from multiple resource allocation requests are captured) is derived for use in the system's signature and identification process. For example, the sequence of time values (or the sequence of differences between time values) acquired across successively listed data segments following the "GET" command comprises one discriminating vector that may serve as an envelope signal or sub-signal. Likewise, the sequence of packet length values acquired across these same data segments comprises another such discriminating vector. Each sequence of parameter values thus obtained along a corresponding data field column across the given set of successively listed data segments then provides a time series of data which may be illustrated as a waveform.

The envelope sub-signal formed in this manner by system 10 for the resource allocation response (by the interconnected remote site) to the local site's "GET" request for the first URI "/" is indicated at block 126. In the illustrated example, data segments similarly captured for other resource allocation requests are available (though not shown in FIG. 1A; see description of FIG. 1C). These other resource allocation requests may be for resources such as image files identified by other URI's (such as ".jpg" or the like) or other embedded resources required for populating the browser display of a certain web page of the remote site. Additional envelope sub-signals formed based on the data segments captured in relation to these other resource allocation requests are indicated at block 128.

Thereafter, an attempt is made to combine all URI-tagged sub-signals (for the same envelope parameter) from the same IP Address in a given interaction into one composite envelope signal. To do this in the disclosed embodiment, the "GET" "/" commands serves as the composite envelope signals' start point. Each URI-tagged sub-signal is then matched to these signal start points and check for sequence consistency, as further described in following paragraphs. The consistent URI-tagged sub-signals are then concatenated together to obtain at block 130 the Combined (Envelope) Signal for the current IP Address and GET "/" operation instance. Other user initiated GET URI requests may replace the GET "/" at block 126 as an indicator of the start point of the Combined Envelope Signal without material change in the functionality of system 10.

The combined envelope signals so obtained are then saved at block 132. System 10 may be operated in a training mode, whereby such envelope signals are obtained over a plurality of interactions between a local site and a remote site. The envelope signals generated from the repeated interactions may be accumulated as samples for the given local-remote site combination at storage block 132.

In order to collapse across samples in a training corpus thus acquired for each local-remote site combination, predetermined analytical measures are applied at block 134 across the envelope signal sample set to obtain a "typical" envelope signal vector representative of the remote website at hand. Preferably, a simple mean of the sample set is taken in this regard. Alternatively, other analytical measures for obtaining a composite/representative envelope signal may be used in place of a simple mean operation. The choice of suitable analytical measure will depend on the particular requirements of the intended application. The typical envelope signal is then taken to be the "Website Signature" of the remote website, as indicated at block 136. One or more website signatures may be thereby acquired for each of a plurality of remote websites, making them 'known' websites. The website signatures may be stored in a signature database 138 for later retrieval, so that the original training signals need not be immediately present when classifying newly-acquired signals for website origination in a subsequent classification mode.

As illustrated, to compare a derived or stored website signature with a newly-acquired, or novel, signal received at block 140, a similarity test comparison between the novel signal and a Website Signature is conducted using a Comparison Metric to obtain a corresponding Comparison Value at block 142. The comparison metric in one exemplary embodiment is preferably an L-2 norm (root mean squared vector distance); however, numerous other metrics known in the art may be used in alternate embodiments. Such other comparison metrics include but are not limited to other norms such as L1 and the like; hamming distances; vector angles; and, matched filter processes. Other comparison metrics may involve more complex analyses, such as those employing principle component and sparse decomposition methods (as further discussed in following paragraphs). The Comparison Value is typically one scalar value for each of the dimensions of comparison, such as a distance.

In certain applications, multiple website signatures based on different dimensions of comparison (different envelope parameters) may be generated for each website. These multiple website signatures may be compared to the envelope signals obtained for the novel signal data according to corresponding envelope parameters. This enables multiple dimensions of comparison for an individual instance of remote site access.

Distance from any one of the multiple website signatures may be the basis of a decision point when comparing novel signals to the known set. In certain applications, website signatures according to multiple envelope parameters (feature types such as packet length and packet time) may be used for joint assessment of novel signal similarity to the signatures of a known website of interest.

In the exemplary embodiment disclosed, a pairwise comparison of features is implemented using linear support vector machine (L-SVM) type decision processes to assess them jointly by segregating areas of a 2-dimensional plane. Decision processes in certain alternate embodiments may be based on a mathematically combined set of comparison values, a voting process, a decision tree, or the like. Other higher dimensional decision processes based on more than two features (signal vector types) may also be employed, as those skilled in the art will recognize in view of the disclosures herein.

Figure 2B:
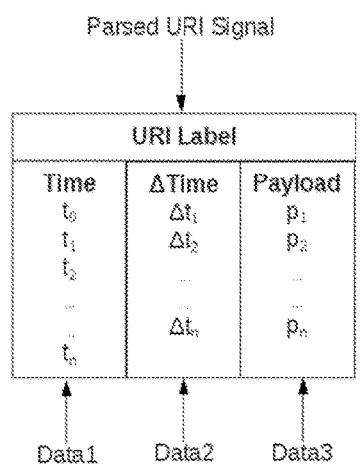
FIG. 2B is a schematic diagram illustrating the vector form of envelope sub-signals obtained from sequences of data segments captured as illustrated in FIG. 1A in the exemplary embodiment of FIG. 2A.

FIG. 2B illustrates examples of parsed URI tagged signals obtained from a set of time-captured data segments for a particular packet sequence much as illustrated in FIG. 1A. The parsed URI signals are labeled with the URI of the originating command and the IP Address, and represented (in this particular example) by three column vectors for packet time, inter-packet timing, and payload size envelope data (Data1, Data2, Data3) extracted across the sequential listing of data segments. Other envelope data may be extracted in other embodiments, and these three illustrative vectors are not intended to be a limiting example. For instance, portions of the payload data might also be used; however, this would largely forfeit the gains in speed, flexibility, and computational burden mentioned in preceding paragraphs. Apparent packet size may also, for example, be measured and used in place of Payload size, fully decoupling the instrumentation of the packet envelopes from their transmitted header data values.

Because the vectors Data1, Data2, Data2 shown in FIG. 2B are time-series vectors (kept organized in a linear fashion as described in following paragraphs), numerous time-series analytical processes may be applied to isolate and identify websites by their overall features. This may not be appropriate on any particular component of the actual payload data. Moreover, the time-series are of relatively small size, even where the total payload data content is significant. Since the envelope sub-signals are defined by these time-series vectors, and since the website signatures are ultimately derived from such sub-signals, each website may be identified by a much more compact signature than would be the case if it were identified by its payload data.

Figure 2C:
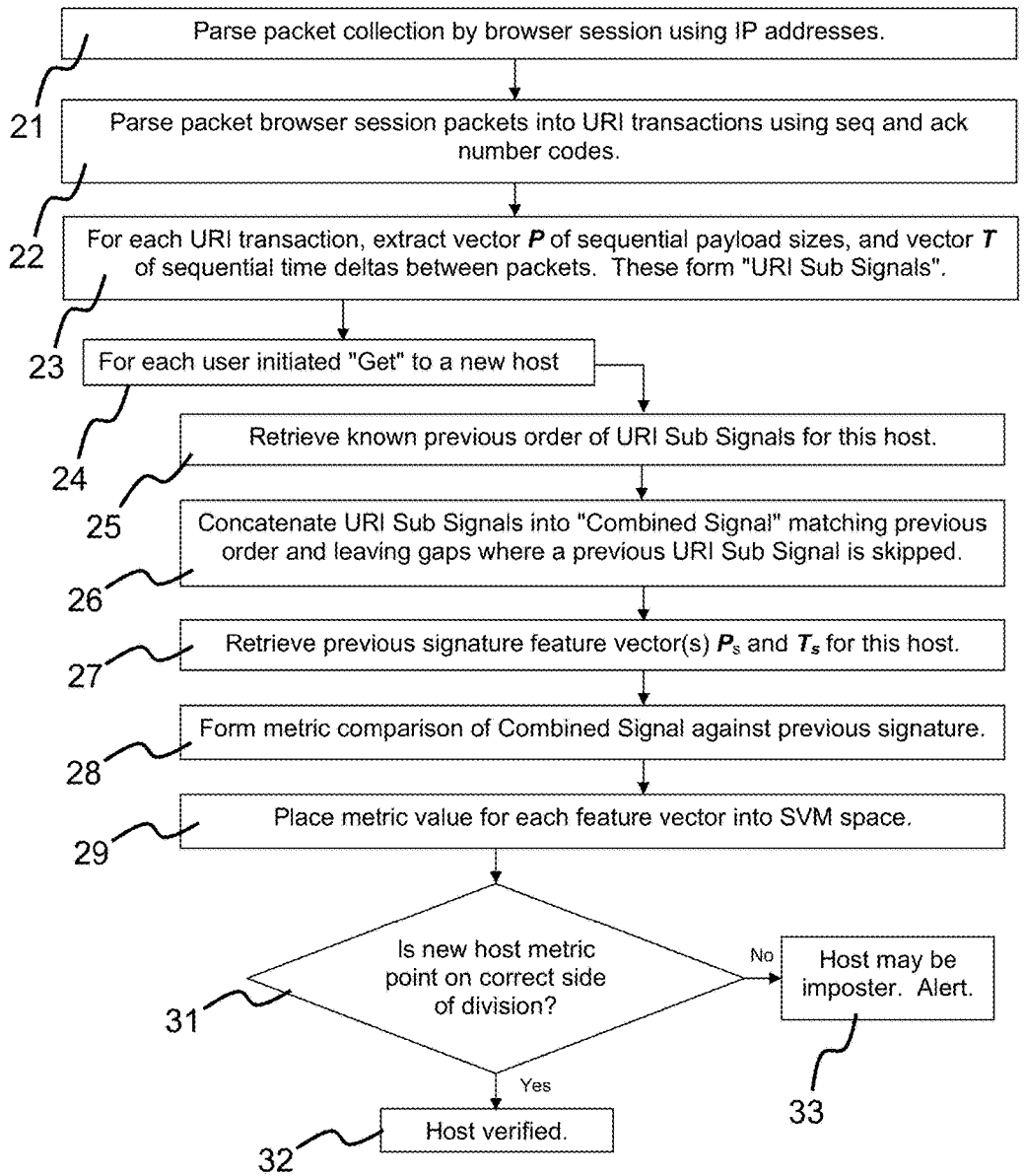
FIG. 2C is a flow chart illustrating the flow of processes in a method implemented by the embodiment of FIG. 2A.
Figure 2D:
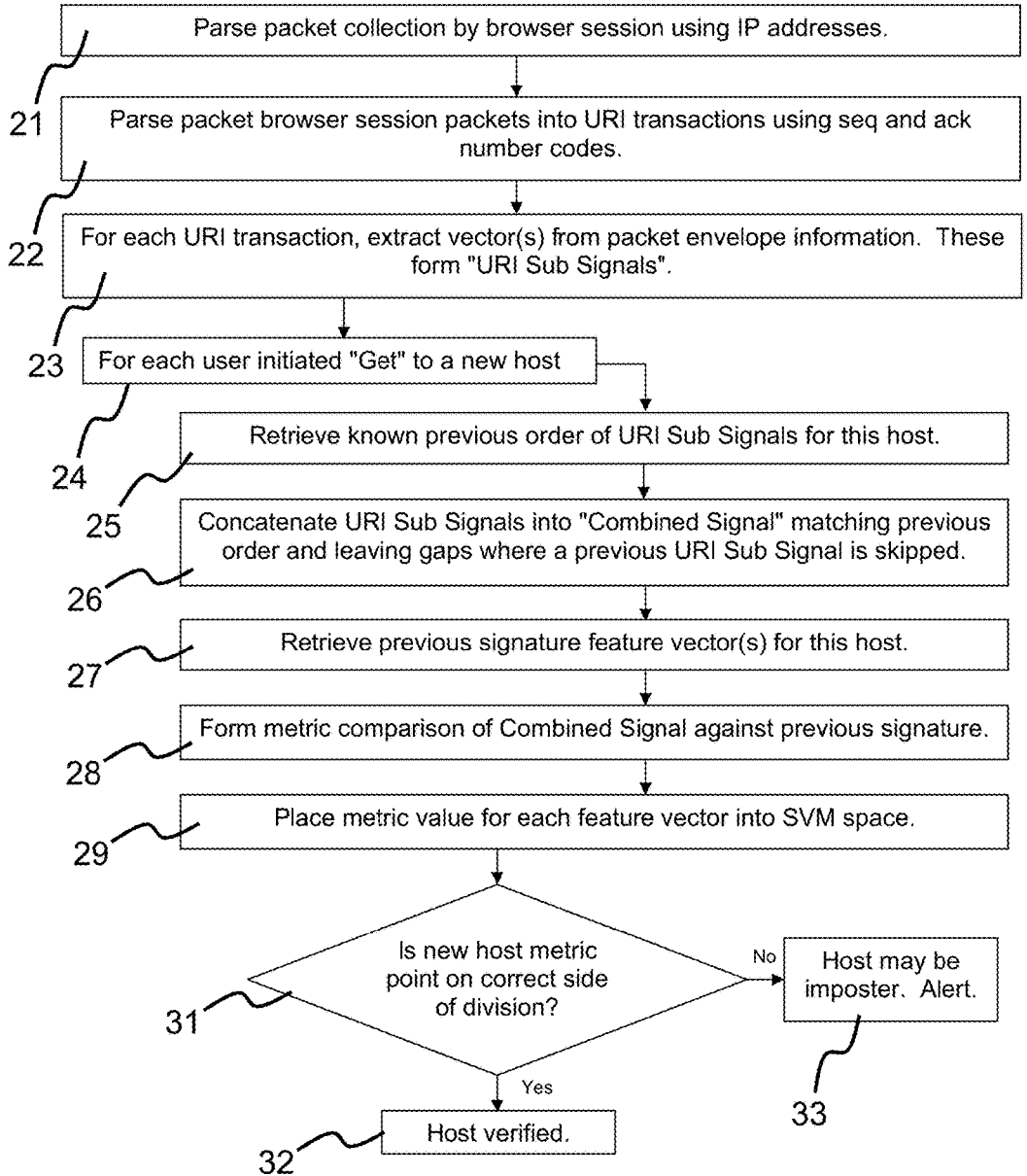
FIG. 2D is a flow chart illustrating the flow of processes in a method implemented as shown in FIG. 2C, but with generalized incorporation of unspecified envelope parameters.

FIGS. 2C-2D are flow chart illustrating the flow of processes in a method carried out by use of system 10 or the like in accordance an exemplary embodiment of the present invention. The flow chart of FIGS. 2C-2D are similar, except that FIG. 2C reflects the particular use of delta time and payload size as envelope parameters (for the feature vectors forming the envelope sub-signals), whereas FIG. 2D reflects the more general use of any extracted feature vector sequence to form one or more envelope sub-signals. Like reference numbers are therefore used in the interests of simplicity and clarity to indicate similar steps in the two flow charts, although minor notational variations consistent with the respective embodiments represented are reflected in certain steps.

At block 21 in these embodiments, the collection of captured packets is parsed by user browser session. This is preferably done using information about the source and destination IP addresses, in any suitable manner known in the art. At block 22, sequence and acknowledge codes within the captured packets are used to group the packets by transaction (or resource allocation sequence). Each group of packets for a transaction is labeled by the initiating packet in the transaction sequence, typically a URI "GET" command in the shown examples as applied to HTML web page identification.

At block 23, selected sequential feature vectors are extracted for each of the URI transactions to form envelope sub-signals. In the primary example shown in FIG. 2C, a vector P is selectively formed by extracting the payload data size values for each of the packet data segments within the grouped segments defining the given URI transaction, and a vector T of time delta values between successive packet data segments is selectively formed by extracting the same from the grouped segments. As indicated at block 23 in FIG. 2D, other embodiments may such feature vectors based on one or more envelope parameters selected as the vectored feature(s).

Beginning at block 24, the envelope signal vectors for each initiated new host access are assembled and compared, in order to verify that host (remote site server) against past activity. The "user" may be a human user, or an automated user programmably established in software, but in any case it is independent of other URI transaction sequences and therefore recognized as a new request for access to a website and signal.

The flow then proceeds to block 25, where the URI envelope sub-signals previously learned from past access to this host website is retrieved. This step may be optional, as the subject system and method in certain embodiments will assemble the envelope sub-signals blindly, in the order that packet data segments are received. In many instances, such blind sequencing is effective since website interactions tend to be relatively consistent; however, in the preferred embodiments, URI orders are recorded so as to better compensate for browser pre-loads and other website interaction dynamics while avoiding false positive detect conditions.

At block 26, the URI envelope sub-signal sequences are assembled either sequentially, or if the information referenced in connection with block 2-5 is available, according to the order reflected in previously recorded envelope sub-signals for the given URI. In certain embodiments, any gap in a combined envelope signal are filled with a suitable number of zero value entries for URI envelope sub-signals not present in a particular instance but present in a past recorded instance. As a result, the similarity metric employed is minimally affected by the omissions. The assembled sequence of URI envelope sub-signals yields a combined envelope signal, or simply "Combined Signal," as used herein.

At block 27, envelope signal vectors for previous instances of the given host website are retrieved. The retrieved envelope signal vectors may include a mean signature vector, a sparsely reduced signature vector, or in certain embodiments, a collection of past recorded samples, each of which forms a signature vector reference. Having made the retrieval, a metric comparison is formed at block 28 between the newly obtained Combined Signal (feature vector) and the retrieved signature signal vector(s). Each comparison between a new feature vector and a previous signature feature vector is preferably reduced to a numeric value. Depending on the particular requirements, different embodiments in this regard calculate such values as an L1-norm of the difference, an L2-norm of the vector difference, a vector inner product, a vector angle, an RMS difference, or the like. These examples are given without limitation, noting the objective of reducing the comparison between two signal vectors to a scalar value, which objective may be realized by numerous measures known in the art. Preferably, an L2-norm of the vector difference is calculated in the illustrated examples.

At block 29, the resulting scalar value or values are place into a suitable context for quick and simple comparison. In the two feature example employing feature vectors P and T, each vector is reduced to a single scalar comparison value, which may then be placed on a graphic plot within a two dimensional plane similar to that illustrated in FIGS. 5A-5B. The location of the plotted point relative to the previously determined dividing line (50) enables the determination at block 31 as to whether the host website access event in question is consistent with a host website for any previously learned website signatures (as indicated at block 32) or not (as indicated at block 33). If not, an alarm is actuated at block 33 to inform the user, to make a log record, or to otherwise handle the exception.

If operating with only one value in one feature, it may be sufficient at block 31 to make a simple thresholding or other check for verification/non-verification of remote website host identity. Such a threshold is illustrated in the example of FIG. 5B for the instance where Payload size or the Delta-Time metrics axes are independently considered and used to distinguish most of the True and False points of verification.

If operating with more than two envelope features, then several methods of combining information known in the art may be suitably employed. An SVM may be trained and evaluated in more than two dimensions. Alternatively, the SVM may be trained and evaluated in pair-wise combinations of derived metrics, and a voting scheme used to determine whether or not a false host site has been accessed.

Figure 3:
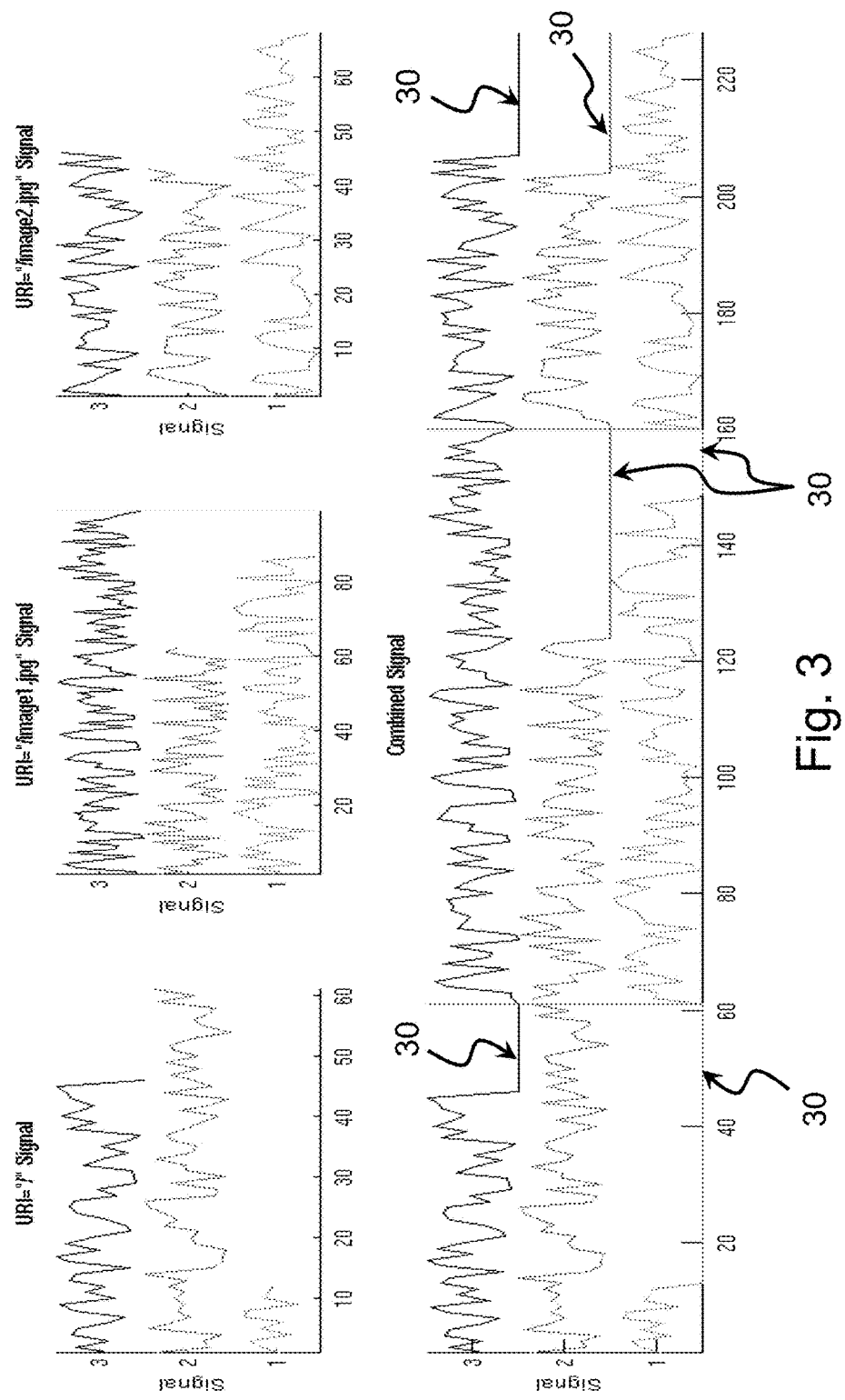
FIG. 3 is a set of comparative graphic plots illustrating examples of envelope sub-signals and their combined envelope signals obtained in the exemplary embodiment of FIG. 2A for communication signals transmitted between the same remote and local sites over different interconnect sessions.

FIG. 3 illustrates examples of parsed signals as time-series graphic waveform plots. In this example, three separate instances of three URI-tagged envelope sub-signals are generated for data segments captured for corresponding resource allocation responses of a particular remote website. Note that different instances (labeled 1, 2, and 3) of the same URI-tagged sub-signal are of different lengths (due for instance to buffering of data acquired from prior interactions with the given website). The sub-signals obtained for the different URI are concatenated into one combined envelope signal (1-3) for each of three website visitation instances.

Zero padding 30 is incorporated to normalize the relative vector lengths where URI-tagged sub-signals are missing or are shorter than their peers in other instances. That is, the abbreviated URI tagged sub-signal is appended with zero values to match in length the longest URI sub-signal peer (of other captured instances). The padded sub-signal is then concatenated with the other URI-labeled sub-signals of the same interaction instance to obtain the Combined Signal for that instance. Preferably, a check is made for consistent signal count. Checks are also preferably made to ensure that each URI signal event matches only one start signal (i.e., URI-tagged sub-signals where the URI is "/" in the working example), and that each start signal is matched by only one URI signal of the specific URI. In this manner, envelope information ascertained from streams of packet transmissions is combined to form a time-sequence signal that may be used to uniquely characterize a website.

Figure 4A:
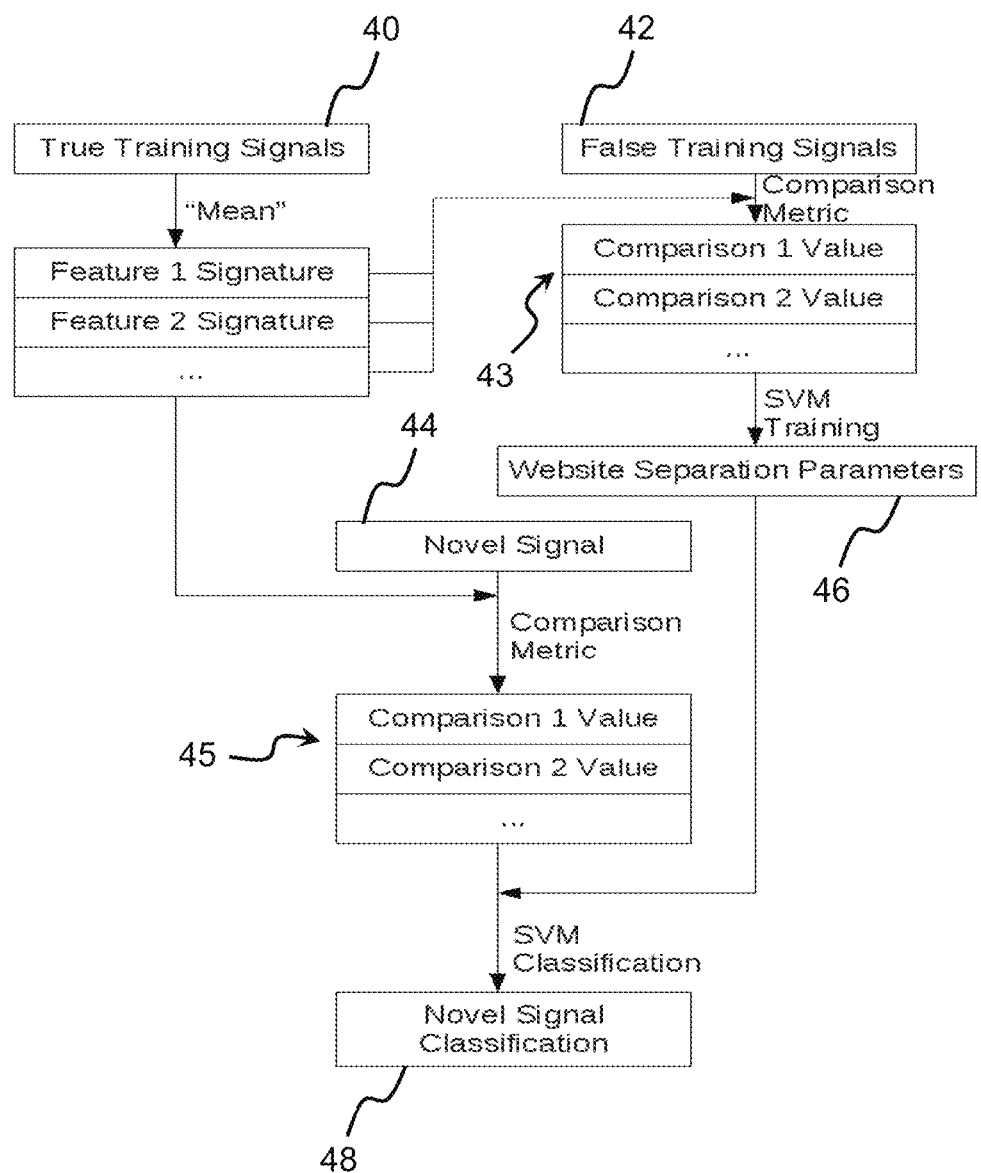
FIG. 4A is a schematic diagram illustrating the flow of processes in training and classification portions of the exemplary embodiment of FIG. 2A.

FIG. 4A illustrates another, more detailed flow diagram of the training and test (or classification) modes of operation preferably undertaken by system 10. To obtain a working classifier system 10 is first trained to recognize certain known websites by their characteristic signatures using training signal samples. These training signal samples include "True" training signals indicated at block 40 that correspond to the target website of interest. The comparison values of these "True" signals are found to often form a fairly tight group in a graphic distribution. Thus, in many applications, this will provide sufficient training, and a simple distance metric is applied to each of the feature signature signals. In such an embodiment, a novel signal is determined to match the training set when its comparison value lies within a pre-established distance of the training group; otherwise, it is determined to not match. However, to ensure sufficient reliability in other more challenging cases, the training signal samples preferably also include in the disclosed embodiment a set of "False" training signals indicated at block 42 that correspond to websites other than the target website. This provides a basis of distinction for the target website from other sites, and corresponding guidance as to how much variance one might expect in instances of true-positive hits as compared to a sample set of potential false-positives. A comparison metric value is generated at block 43 for each signature feature of the target website and subjected to SVM training over multiple instances of inter-active access to obtain a set of Website Separation Parameters at block 46 which provide negative comparison measures for disassociating a novel signal from the target website. This multiple instance training is typically but not always the case, as single exposure training/learning may suffice in certain applications.

The comparison metric may take many forms. In the illustrated example, an L2-norm metric is used. For each element in a mean envelope signal vector obtained for the False Training Signal, a difference from the corresponding element in the characteristic signature mean vector is taken then squared, after which the squares are summed and a square-root taken. In two-dimensions, this is simply the Euclidian distance between the test signal vector and the corresponding mean of the given signature vectors. The distances of the True signals' mean envelope signal from the mean signature signal are taken as well to populate a graphic plot with points for each instance of access to the website.

Figure 5A:
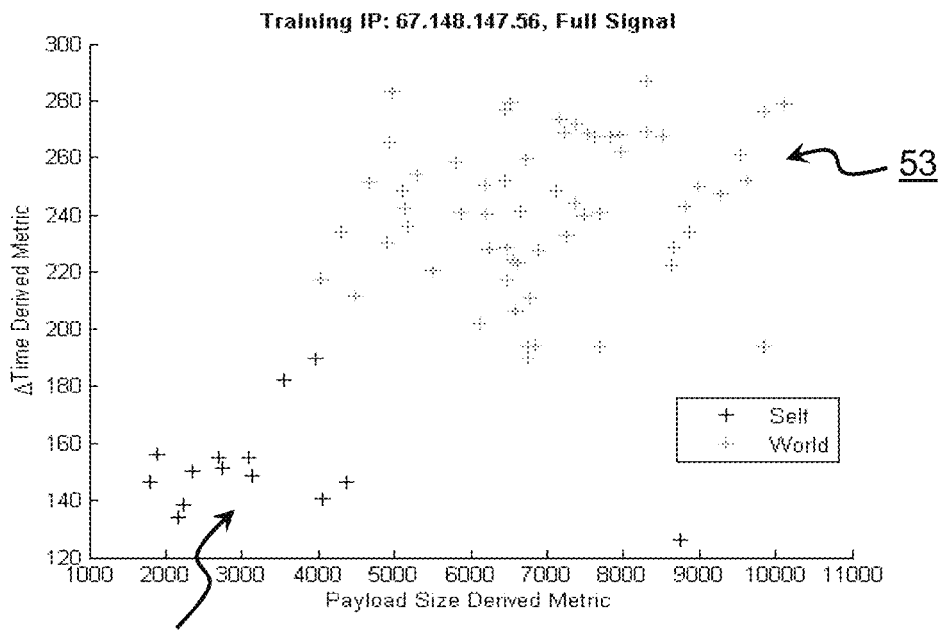
FIG. 5A is an illustrative graphic plot for examples of comparison values obtained during a training mode of operation by the exemplary embodiment of FIG. 2A.
Figure 5B:
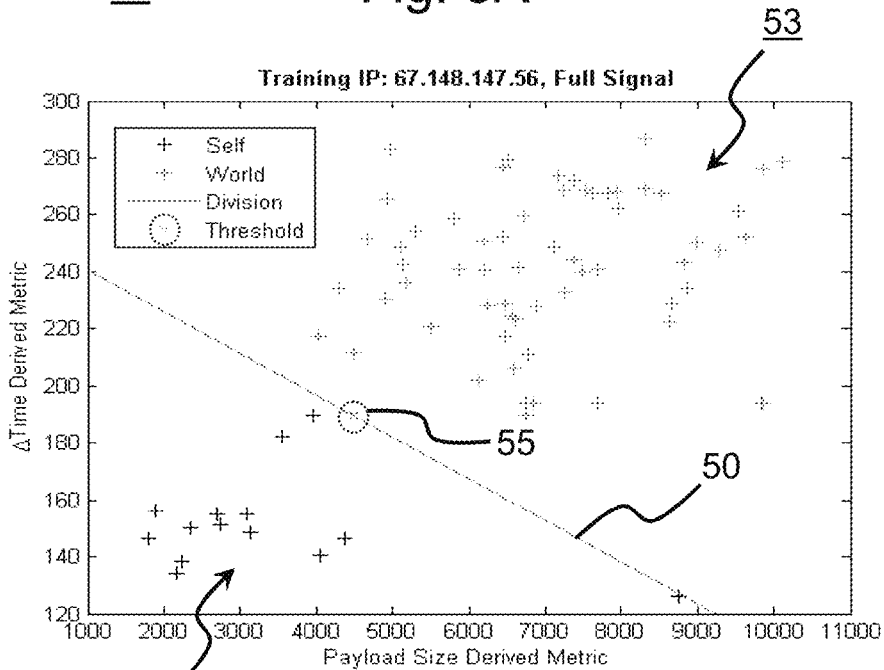
FIG. 5B is the graphic plot of FIG. 5A, annotated with dividing line and threshold indicia for separating classes of graphically plotted points.

This is illustrated in FIGS. 5A-5B (described in more detail in following paragraphs) which show graphic plots of the comparison values obtained at block 43 (of FIG. 4A) based on inter-packet time and payload size comparison metrics. A dividing line 50 established between the regions of True and False training signals provides decision criteria by which subsequently acquired novel signals may be rapidly classified against this target website.

Figure 4B:
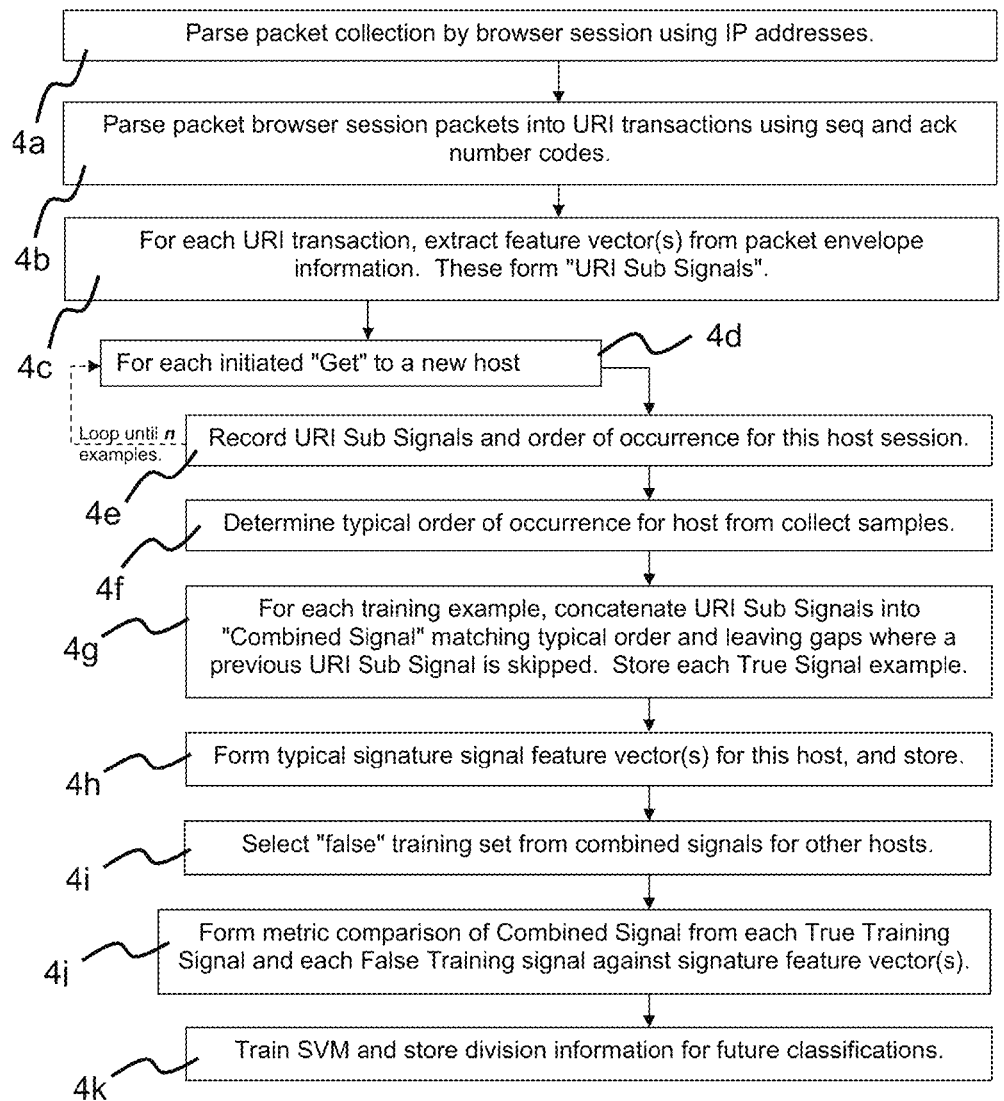
FIG. 4B is a flow chart illustrating the flow of processes in training and classification portions a method implemented by the embodiment of FIG. 2A.

FIG. 4B is a flow chart illustrating the flow of training processes learning signatures from new websites in a method carried out by use of system 10 or the like in accordance an exemplary embodiment of the present invention. At block 4a, the collection of captured packets is parsed by user browser session. This is preferably done using information about the source and destination IP addresses, in any suitable manner known in the art. At block 4b, sequence and acknowledge codes within the captured packets are used to group the packets by transaction (or resource allocation sequence). Each group of packets for a transaction is labeled by the initiating packet in the transaction sequence, typically a URI "GET" command in the shown examples as applied to HTML web page identification.

At block 4c, selected sequential feature vectors are extracted for each of the URI transactions to form envelope sub-signals. In the primary example shown, a vector P is selectively formed by extracting the payload data size values for each of the packet data segments within the grouped segments defining the given URI transaction, and a vector T of time delta values between successive packet data segments is selectively formed by extracting the same from the grouped segments. Other embodiments may such feature vectors based on one or more envelope parameters selected as the vectored feature(s).

Beginning at block 4d, a training loop is carried out for each independent website host of interest, to be referenced as known remote sites for future detection and classification. The remaining steps carried out at blocks 4e-4k occur for each website host of interest. These steps of blocks 4e-4f are shown and described in the context of only one exposure to a host, but will preferably operate on a collection of numerous exposures to the same host. Training may be carried out one time on a collection of examples, or in certain embodiments, the training may be carried out iteratively, adding each confirmed access to a given host into a pool and retraining frequently. The latter approach is more adaptive, and provides for learning on a continual basis from ongoing website exposure.

At block 4e, the URI Sub Signals extracted at block 4c are recorded along their order of occurrence. After a predetermined number of samples are captured, they are used to train the method. Block 4f begins by determining the typical order of URI transactions. The captured samples are searched to determine the maximum URI transactions that have previously been associated with the given host, and the first is chosen if more than one past transactions are found of similarly long length. At block 4g, each of the other training samples is then ordered to match the longest sample on record, leaving gaps where URI transactions have been omitted. For storage purposes, any filler code may be used in the gaps. For mathematical purposes, the filler value is preferably chosen to create minimal effect on the resulting signature. Thus, zero values are found to be appropriate in the disclosed example.

Each collection of URI transaction sub-signals is concatenated into one long combined envelope signal representative of the host, and each resulting envelope signal vector is preferably of the same length. A combined envelope signal vector is formed for each envelope feature of interest. Consequently, this reduction to a combined envelope signal vector is made in the disclosed example for each vector P of payload data sizes and a vector T of time deltas between packets. In other embodiments, such reduction to a combined envelope signal vector is made for each of these and/or any other selected feature (envelope parameter).

At block 4h, a typical signal vector is formed, which comprises a representative signature of the web host. In one embodiment, a mean of the envelope signal vectors collected over different sessions is taken. In other embodiments, a root mean square (RMS) average is taken over the envelope signal vectors. In yet other embodiments, a sparse approximation of the signal vectors is made and equivalent means are found in the reduced dimensional space which results. A typical signal vector is thereby formed using such measures for each combined feature vector. In the given example, a typical signal vector is found for each vector P of payload data sizes and a vector T of time deltas between packets.

Once a reference signature has been established for the "true" training group, in the disclosed embodiment, a random collection of "false" training samples are selected at block 4i from host sessions known to be other than with the true target host. These may include host session traffic with all other recorded hosts to date, or may include simply a random selection of web host session traffic.

At block 4j, each recorded host session's combined envelope signals—that is, all known true training samples and all known false training samples—are taken to form a metric comparison for each with respect to the typical signature vector(s) determined at block 4h. Each comparison between a training feature vector and a signature vector for that feature is preferably reduced to a numeric value. Depending on the particular requirements, different embodiments in this regard calculate such values as an L1-norm of the difference, an L2-norm of the difference, a vector inner product, a vector angle, an RMS difference, or the like. These examples are given without limitation, noting the objective of reducing the comparison between two signal vectors to a scalar value, which objective may be realized by numerous measures known in the art. Preferably, an L2-norm of the vector difference is calculated in the illustrated examples.

SVM training is then performed at block 4k on the resulting values, with each value plotted into an appropriate dimensional space, and a separation divider (or partition) is determined therefrom. The divider provides a delineating reference by which values obtained from future host sessions may be classified.

Other Comparison Methods

It will be apparent that SVM is not the only comparison and classification tool that may be applied. While an SVM approach is preferred, those skilled in the art will recognize that once a web host access instance has been reduced to a signal vector as disclosed herein, other known approaches may be suitably taken. For example, a fixed threshold to any comparison metric disclose herein may be applied in order to determine whether a subsequent access to the same apparent web host is or is not "similar" enough to previous instances to constitute a match.

It will also be apparent in light of the disclosed system and method that one need not explicitly reduce each web host to precisely one combined envelope signal for each feature type (envelope parameter). For example, specific envelope sub-signals may be used individually, or combined into subsets, in order to form the basis for comparison.

Moreover, in certain embodiments, resulting URI sub-signals need not be concatenated into a combined signal. Each URI sub-signal may be considered alone for purposes of training and testing, and omissions in any web-host access instance simply ignored in the comparison. In certain embodiments, detection of each URI sub-signal may be made independently by an SVM classifier or another detector, and the combined results of multiple detections used to determine the likelihood that a particular host has been accessed. It should be noted, however, that the exemplary embodiment disclosed which reduces each web instance to one signal and includes Δt information will benefit from encoding the timing between typical URI "GET" signals, as this information is lost when URI sub-signals are treated independently.

Referring back to FIG. 4A, a process identical to that described for sample training signals is preferably employed during a classification mode of operation for system 10. Envelope signals obtained for a novel signal received at block 44 are compared to the mean True training signatures by a comparison metric to obtain Comparison values 45 for each signature feature.

By placing this point in the exemplary embodiment disclosed within the context of the space defined by suitable SVM training it can be determined whether the Novel Signal is more similar to the target website or more similar to that of the false training samples and therefore distinguishable from the target website. In alternate embodiments not illustrated, means other than SVM may be used. For example, a single comparison value, a threshold value, or the like may be used as to test similarity of the Novel signal to the signature signal of any target website of interest. A novel signal may then be quickly and effectively evaluated for similarity to multiple target websites of interest simply by repeating this process using other training data. Note that, the disclosed embodiment simply requires that Feature Signatures and Website Separation Parameters be available in order to make a comparison. Thus very little information need be retained on hand to enable a fast, reliable detector that can be used for screening large amounts of network traffic for relevant hits.

FIGS. 5A and 5B illustrate example planar SVM separation of Data. SVM is a technique known in the art of machine-learning. As used herein, the SVM is directed to a computer implemented process that attempts to calculate a separating partition between different categories of data. The data is projected into a plurality of dimensions, and the partition will comprise a surface in a dimension less than that of the projection. Thus, in certain exemplary applications, data is projected in two dimensions, and a line comprises the partition. In three dimensions, the separating surface would comprise a plane; and, in N-dimensions, the separating surface would comprise a mathematical hyperplane. Without loss of generality, it is possible to use curved surfaces in place of a linear surface for the partition.

In general, the partition effectively separates the dataspace into two 'half' spaces, corresponding to the categories of interest. It is feasible to segment the space into more than two regions where necessary in other embodiments and applications. Linear surfaces and bi-section are preferably used for computational speed. Depending on the application, a voting system may be constructed that enables multi-featured data to be addressed deterministically.

In FIG. 5A, the points 52 at the bottom left region of the plot represent True training signal samples for the target website of interest, while those points 53 at the upper right region of the plot represent the False training signal samples known to correspond to other websites not the target. Each point marked with a cross represents one test case (an instance of website access), placed into a two-dimensional planner space by comparison of its respective Time metric distance and Payload Size distance from the group mean signatures based on each feature. In FIG. 5B, the dividing line 50 represents a natural separation of the space between the True and False samples. The line 50 is obtained by a suitable SVM process known in the art. When envelope signals generated for a novel signal is compared to the mean group signature for the target website in the two dimensions illustrated, they may also be placed in the 2D plane shown. If the placement is to the upper right of the dividing line 50, the novel signal is classified as originating from a site different from the target website. Otherwise, if the placement is below and left of the dividing line 50, the novel signal is classified as originating from a site very similar to the target website and therefore likely to have originated from the same site (as indicated at block 48 in FIG. 4A).

In this example, each of the points disposed in the lower left region of the plot which represent different instances of access to the same site are neatly clustered away from the points of other websites. This illustrates how readily websites may be distinguished from their peers based on certain envelope parameters without the need to read, decode, or otherwise use IP address or payload data content to do so.

To illustrate an alternate embodiment, FIG. 5B also includes a point 55 disposed on line 50. This point 55 represents a threshold by which a single dimension of comparison may be used to distinguish the target website from the majority of its peers. Note that any individual dimension illustrated in this example makes for an imperfect separation, while the 2D application of both feature dimensions in the plane make for a perfect (or complete) separation of the target website from its peers.

Figure 6A:
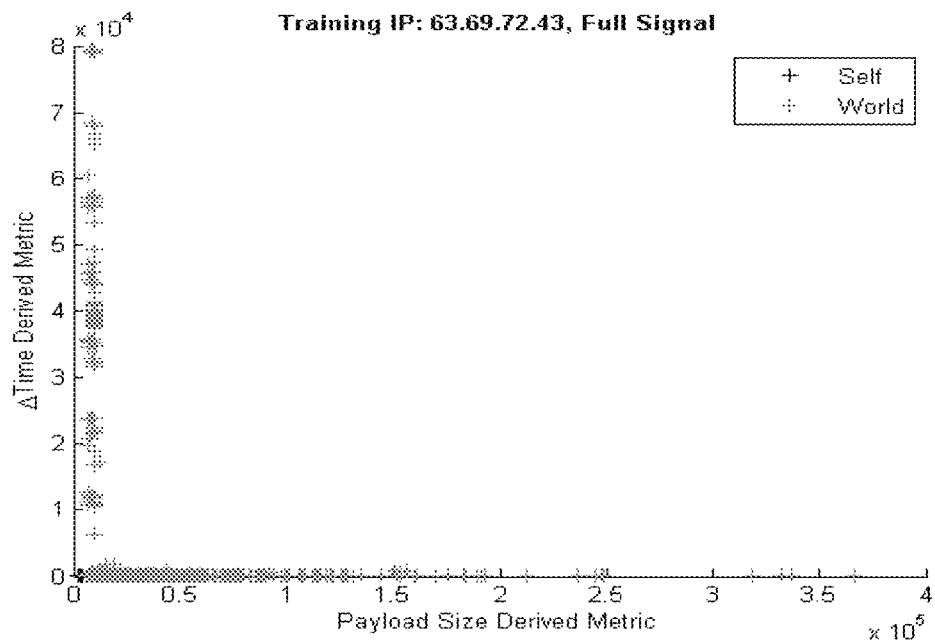
FIG. 6A is an illustrative graphic plot similar to that shown in FIG. 5A, of comparison values obtained during a training mode of operation by the exemplary embodiment of FIG. 2A, with a larger set of non-matching remote sites; and, FIG. 6B is an enlarged view of a portion of the graphic plot shown in FIG. 6A, annotated with dividing line and threshold indicia for separating classes of graphically plotted points.
Figure 6B:
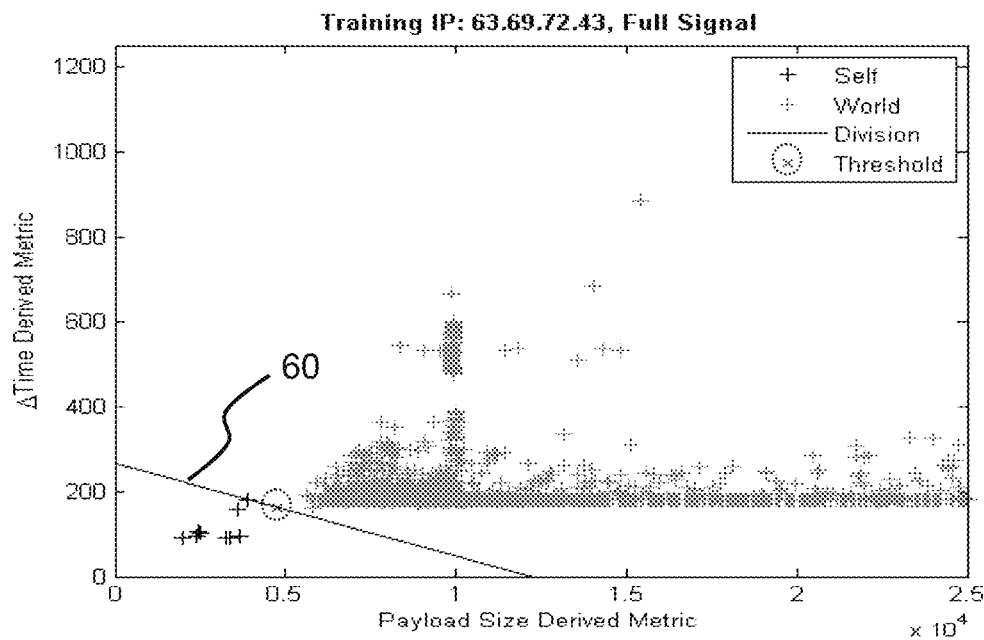

FIGS. 6A-6B further illustrate planer SVM separation of Data tested against a larger dataset. In the illustrated case, a different IP address is used to establish a target website signature. FIG. 6A shows the entire space of comparison between the target website and over 6000 others. As it is difficult to see the cluster of true-positive points in this plot, due to the other sites' extremely large range of divergence from the target, FIG. 6B shows an enlarged view of a lower left corner of the plot. Again, those points to the lower left of the dividing line 60 comprise samples of signals extracted from the target website while those to the upper right of the line 60 comprise samples of signals extracted from all other websites. Perfect separation is achieved by the dividing line 60, even with a large number of test cases.

Parsing

Turning more closely to the unit within system 10 for carrying out the parsing of the captured segments of packet data to signal data, the first task in the parsing process is to identify which points in the packet chain represent the signal starting positions. In the disclosed embodiment, the signal start positions are defined as frames with a Protocol of "HTTP" and a Request Method of "GET." In the particular example shown in FIG. 1A, a Source IP Address of "69.244.66.17" is used. The recording has been made on the outside of a NAT firewall and thus all request data of interest will appear to be sourced from this IP address. To identify all members of the same signal, the corresponding packets must be linked. The Source and Destination IP addresses, Source Port, and Next Sequence Number are saved for the start signal. These are then compared to the Destination and Source IP addresses, Destination Port, and Acknowledgment Number of all potential members of the signal in the captured data chain. By checking IP addresses, the members of a signal are restricted to those coming from the same address, and by checking the Port and Acknowledgment Numbers, the members' response to the previously identified "GET" request is ensured. Signal types are labeled based on the Destination IP address of the start signal and the URI ("universal resource identifier") of the start signal (see FIG. 2B). A "signal" is thus considered to be a data column vector obtained from all packets returning information from the same website during the same brief session of interaction. In this example, an interconnect "session" may be limited by either a maximum timeout duration or by the occurrence of the next "GET" "/" request, whichever occurs first.

In the exemplary embodiment disclosed, the Payload Size of the member signal and the Time at which the member signal was recorded are extracted. In addition, the capture Time of the start signal is recorded as the first point of the time signal. This enables use of inter-packet Time (the sequential differences in arrival times between packets) as a signal of equal length to the Payload Size signal.

Concatenation

A website typically references different component files indexed by their URI to display itself (e.g. images are saved separately and put together upon viewing with the HTML code). In order to retrieve this extra information, an accessing computer will send a "GET" command for each bit of extra information. Each additional "GET" operation results in an additional envelope sub-signal with a new URI label that may be linked to the starting sub-signal resulting from the initial "GET" operation. Thus, all of the extra information sub-signals are preferably gathered with different labels and appended to the starting signal in order to obtain a combined signal representative of the entire website download process.

The first step in the disclosed embodiment is to identify all signals with the same IP address. Next, all of the "GET" "l" commands are identified and set as the starting points for the combined signals to be concatenated. The URI sub-signal associated with the starting point "GET" "/" request is termed the "start signal." Also, the time that all "GET" commands were made are retained, so that time windowing may be used to determine which concatenated signal an extension belongs to. Preferably, only URIs that match at least a majority of the start signals are added (this allows some margin for internet errors such as HTTP 404 errors), eliminating from consideration any URI's not having enough sub-signals.

Next, each URI-labeled sub-signal (Parsed Signal) is examined to attempt a match of the signals they contain to the existing start points for the concatenated signals. To do so, the difference in times between all "GET" "/" commands and each other "GET" <URI> commands are calculated, and each URI sub-signal is then mapped to the appropriate start signal. All URI commands are mapped to the start command signal ("GET" "/") to which they are closest, with those URI sub-signals that came before the closest start signal then eliminated from the group. Checks are then made to ensure that only one start signal exists for every URI command signal and that a majority of the start signals are actually matched with a URI sub-signal. The typical sequence in which URI sub-signals follow their respective start signal is then determined from the example set. If a URI sub-signal in a particular position in the typical sequence is not matched in a majority of the training cases, then the URI sub-signal is determined to be spurious and eliminated from the signature pattern. If a start signal contains more than one mapped sub-signal with the same URI label in the same or similar sequence position, the entire command sequence is eliminated from the training signal list. This may occur, for example, where users navigate to a particular website component URI themselves, thereby circumventing the normal "GET" "/" command and casting doubt over the matching process.

The URI sub-signals are then concatenated to the start signals to form a combined signal representative of each website access instance. Note that the individual envelope sub-signals may be different in length from other sub-signals from the same URI request command. As noted previously, this may occur because of dynamics in the download process such as buffering of images by a browser program or the like that reduce the requisite amount of data transfer. Thus, longer and shorter start signals and URI command sub signals may result. To compensate for this, a string of empty-value codes are preferably appended to sub-signals of each URI abbreviated in this regard, so that an identical number of elements make up each URI command's combined envelope signal. This includes the start signals. It does not matter if different signals for different websites are of different lengths, only that multiple signals for the same web site are of the same total length.

The disclosed embodiment allows one to limit the combination signals based on time between commands, by forcing URI commands to be within some time threshold of the start signals. This provides an additional cross check that the URI commands are actually occurring subsequent to and responsive to the same "GET /" (or other) start signal.

When executed, the disclosed embodiment creates one set of signals for each "GET" "/" command in the data, whereby an envelope "signal" is created from a set of captured packets. A substantially identical process is carried out both for collecting training data and for collecting novel signals which are to be classified.

Classification

Once a full set of website signatures is obtained, newly-acquired communication signals may be quickly and conveniently classified according to their remote site origins. That is, the envelope signal(s) obtained for the newly-acquired communication signals may be compared to known website signatures for classification in this regard. Before the envelope and signature signals may be compared directly, they must be aligned in length. The comparison processing thus accounts for the presence of empty-value codes properly which may have been introduced during the combining of URI envelope sub-signals as described in preceding paragraphs. Where necessary, the padding value are changed to zero values, and any additional padding required is incorporated by adding zero values to accordingly lengthen all signals from the shorter set. This forces the two signal sets for comparison to be of the same length.

In the exemplary embodiment disclosed, a test signature is formed by taking an average (mean) across all signals from the training group. This is the most basic training mode of operation. More elaborate weighted averages may be used in other embodiments, as may more complex analytical approaches such as principal component analysis to reduce the dimensionality of the signals.

One analytical approach of particular note in this regard in another alternate embodiment is the execution of a simultaneous sparse approximation to reduce the dimensionality and concentrate information in only a few terms (such as disclosed in U.S. Pat. No. 7,079,986 entitles "Greedy Adaptive Signature Discrimination System and Method," issued to J. Sieracki). An advantage of combining the use of such simultaneous sparse approximation methods with SVM is that high-accuracy decisions may be made thereby based on a sub-space of only two dimensions—which further reduces computational complexity. In these and other applications, algorithmic measures for calculating a partition line are not limited; and, any fast approximating algorithm may be employed for a partition even if that algorithm works only in two dimensions.

Returning to the exemplary embodiment at hand, any instance of a website visit may then be reduced to a comparison value. Preferably, an L-2 norm (root-mean square distance) is applied as described in preceding paragraphs between the average training signal and individual testing signals of same type (classification dimension, envelope parameter). This results in two values for each training signal (in the particular case illustration): a Payload Size Comparison value and a Time Comparison value. These can be placed as points in a 2D plane. The final determination of classification is obtained preferably via an SVM classifier as described in preceding paragraphs.

In this manner, it may be determined whether or not any particular derived signal is derived from a target website (whose typical website data stream characteristic has been learned), or is in fact derived from a different website. In similar fashion, detection of remote site origination in any other network based interaction may be determined without recourse to the payload data, provided training samples are acquired from which to learn the applicable protocol interaction blocks and extract envelope signal data streams.

The system and method disclosed herein will have broad application apparent to those skilled in the art once they have understood the present disclosure. Upon reviewing the novel combinations of elements disclosed in the specification and figures and the teachings herein, it will be clear to those skilled in the art that there are many ways in which the subject system and method may be implemented and applied. The description herein relates to the preferred modes and example embodiments of the invention.

The descriptions herein are intended to illustrate possible implementations of the present invention and are not restrictive. Preferably, the disclosed method steps and system units are programmably implemented in computer based systems known in the art having one or more suitable processors, memory/storage, user interface, and other components or accessories required by the particular application intended. Suitable variations, additional features, and functions within the skill of the art are contemplated, including those due to advances in operational technology. Various modifications other than those mentioned herein may be resorted to without departing from the spirit or scope of the invention. Variations, modifications and alternatives will become apparent to the skilled artisan upon review of this description.

That is, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A method executed using computer hardware having computer processing of program instructions stored in a computer readable medium for distinguishing between a plurality of remote sites accessed through a network interconnection by a reference site based upon envelope characteristics of communication signals transmitted therebetween, comprising:
    time-capturing a plurality of segments of the communication signals transmitted during an interconnected session interactively established between one of the remote sites and the reference site;
    parsing the time-captured segments to selectively generate for the interconnected remote site an envelope signal indicative of at least one resource allocation response thereof during the interconnection session, each said generated envelope signal being distinct to the interconnected remote site and including at least one time-series vector characterizing a waveform defined by time-ordered values of at least a first predetermined envelope parameter acquired from the time-captured segments, each envelope parameter defined in at least one communication packet of the time-captured segments according to a communication protocol shared by the remote sites and the reference site; and,
    establishing a characteristic signature responsive to said envelope signal generated for each interconnected remote site to be identified, said characteristic signature uniquely identifying the interconnected remote site, whereby newly-captured communication signal segments are classified in remote site origination based on said characteristic signatures of identified remote sites;
    wherein:
        the remote sites are each websites on the world wide web, and the reference site is a client connected to the world wide web configured to communicate with the websites in accordance with a Hypertext Transfer Protocol (HTTP);
        each resource allocation response of a website includes accessing at least one resource thereof by Universal Resource Identifier (URI); and,
        each said envelope signal is defined by values of said first predetermined envelope parameter acquired from the time-captured segments received responsive to an HTTP "Get" command transmitted from the reference site, the HTTP "Get" command associated with one URI.

2. The method as recited in claim 1, wherein for each remote site configured to actuate a resource allocation response accessing multiple resources said parsing generates a plurality of envelope sub-signals each corresponding to one accessed resource, said envelope signal being formed to include a concatenation of said envelope sub-signals one with the other.

3. The method as recited in claim 2, wherein said parsing generates a plurality of said envelope signals for each remote site to be identified, a first of said envelope signals for the remote site being defined according to said first predetermined envelope parameter, and at least a second of said envelope signals for the remote site being defined according to a second predetermined envelope parameter.

4. The method as recited in claim 2, wherein:
    each of the time-captured segments represents a packet of communications data transmitted through the world wide web according to the Transmission Control Protocol/Internet Protocol (TCP/IP).

5. The method as recited in claim 4, wherein:
    each of the time captured-segments includes time and packet length information for the communications data transmitted thereby; and, said first predetermined envelope parameter is defined by at least one of the time information and packet length information.

6. The method as recited in claim 1 further comprising classification of said envelope signal generated for newly-captured communication signal segments from an interconnection session established between an unidentified remote site and the reference site, the newly-captured communication signal segments being classified in remote site origination responsive to comparison of said envelope signal thereof with said characteristic signatures of identified remote sites.

7. The method as recited in claim 6, wherein generation of said characteristic signature includes a training process based quantitatively upon a plurality of said envelope signal samples generated for the same remote site to be identified.

8. The method as recited in claim 7, wherein said characteristic signature is generated based upon a quantitative mean of said envelope signal samples for the remote site to be identified.

9. The method as recited in claim 6, wherein said classification includes a comparison process applying at least one predetermined comparison metric to compare each said envelope signal of the newly-captured communication signal segments with at least one of said characteristic signatures of identified remote sites, said comparison process generating for each comparison a comparison value corresponding to each said predetermined comparison metric.

10. The method as recited in claim 9, wherein said classification includes a predetermined decision process applied to said comparison values to classify each newly-captured communication signal segment in remote site origination, said predetermined decision process being selected from the group consisting of: a graphic linear support vector machine (SVM) process, a quantitative thresholding process, and a voting tree process.

11. The method as recited in claim 10, wherein said predetermined comparison metric is selected from the group consisting of: a norm of a vector distance, a root mean squared vector distance, a hamming distance, and a vector angle.

12. The method as recited in claim 10, wherein said predetermined comparison metric is based on a process selected from the group consisting of: a matched filter process, a principle component process, and a sparse decomposition process.

13. The method as recited in claim 10, wherein said training process generates for each of the identified remote sites at least one website separation parameter indicative of permissible variation in said comparison value for classification with the identified remote site, said training process generating said separation parameter at least partially based upon a plurality of false training envelope signals obtained for time-captured segments of communication signals originating from one or more sites different from the identified remote site.

14. The method as recited in claim 1 at least partially implemented as an online application for a mobile communication device for execution thereon to identify and classify the remote site origination of communication signals received thereby during an interconnect session.

15. The method as recited in claim 1 programmably implemented and stored in a non-transitory computer readable medium.

16. A system employing computer hardware having one or more computer processors and program instructions stored in a computer readable medium for distinguishing between a plurality of remote sites accessed through a network interconnection by a reference site based upon envelope characteristics of communication signals transmitted therebetween, comprising:

a capture unit executed on one or more of the computer processors, said capture unit time-capturing a plurality of segments of the communication signals transmitted during an interconnected session interactively established between one of the remote sites and the reference site;

a parsing unit executed on one or more of the computer processors, said parsing unit being coupled to said capture unit to selectively generate for the interconnected remote site an envelope signal indicative of at least one resource allocation response thereof during the interconnection session, each said generated envelope signal being distinct to the interconnected remote site and including at least one time-series vector characterizing a waveform defined by time-ordered values of at least a first predetermined envelope parameter acquired from the time-captured segments, each envelope parameter defined in at least one communication packet of the time-captured segments according to a communication protocol shared by the remote sites and the reference site; and, a signature unit executed on one or more of the computer processors, said signature unit being coupled to receive said envelope signal from said parsing unit for each interconnected remote site to be identified, said signature unit establishing responsive to said envelope signal a characteristic signature for uniquely identifying the interconnected remote site, newly-captured communication signal segments being thereby classified in remote site origination based on said characteristic signatures of identified remote sites;

wherein:
the remote sites are each websites on the world wide web, and the reference site is a client connected to the world wide web configured to communicate with the websites in accordance with a Hypertext Transfer Protocol (HTTP);

each resource allocation response of a website includes accessing at least one resource thereof by Universal Resource Identifier (URI); and, each said envelope signal is defined by values of said first predetermined envelope parameter acquired from the time-captured segments received responsive to an HTTP "Get" command transmitted from the reference site, the HTTP "Get" command associated with one URI.

17. The system as recited in claim 16, wherein said parsing unit generates for each remote site configured to actuate a resource allocation response accessing multiple resources a plurality of envelope sub-signals each corresponding to one accessed resource, said parsing unit concatenating said envelope sub-signals one with the other to form said envelope signal.

18. The system as recited in claim 17, wherein said parsing unit generates a plurality of said envelope signals for each remote site to be identified, a first of said envelope signals for the remote site being defined according to said first predetermined envelope parameter, and at least a second of said envelope signals for the remote site being defined according to a second predetermined envelope parameter.

19. The system as recited in claim 16, wherein:
each of the time-captured segments represents a packet of communications data transmitted through the world wide web according to the Transmission Control Protocol/Internet Protocol (TCP/IP);

each of the time captured-segments includes time and packet length information for the communications data transmitted thereby; and, said first predetermined envelope parameter is defined by at least one of the time information and packet length information.

20. The system as recited in claim 16 further comprising a classifier unit coupled to said parsing unit, wherein said parsing unit generates said envelope signal for newly-captured communication signal segments from an interconnection session established between an unidentified remote site and the reference site, said classifier unit classifying the newly-captured communication signal segments in remote site origination responsive to comparison of said envelope signal thereof with said characteristic signatures of identified remote sites.

21. The system as recited in claim 20, wherein said signature unit includes a training portion generating said characteristic signature based quantitatively upon a plurality of said envelope signal samples generated for the same remote site to be identified.

22. The system as recited in claim 21, wherein said training portion generates said characteristic signature based upon a quantitative mean of said envelope signal samples for the remote site to be identified.

23. The system as recited in claim 20, wherein said classifier unit includes a comparison portion applying at least one predetermined comparison metric to compare each said envelope signal of the newly-captured communication signal segments with at least one of said characteristic signatures of identified remote sites, said comparison portion generating for each comparison a comparison value corresponding to each said predetermined comparison metric.

24. The system as recited in claim 23, wherein said classifier unit includes a decision portion coupled to said comparison portion, said decision portion applying a predetermined decision process upon said comparison values to classify each newly-captured communication signal segment in remote site origination, said predetermined decision process being selected from the group consisting of: a graphic linear support vector machine (SVM) process, a quantitative thresholding process, and a voting tree process.

25. The system as recited in claim 24, wherein said predetermined comparison metric is selected from the group consisting of: a norm of a vector distance, a root mean squared vector distance, a hamming distance, and a vector angle.

26. The system as recited in claim 24, wherein said predetermined comparison metric is based on a process selected from the group consisting of: a matched filter process, a principle component process, and a sparse decomposition process.

27. The system as recited in claim 24, wherein said training portion of said signature unit generates for each of the identified remote sites at least one website separation parameter indicative of permissible variation in said comparison value for classification with the identified remote site, said training portion generating said separation parameter at least partially based upon a plurality of false training envelope signals obtained for time-captured segments of communication signals originating from one or more sites different from the identified remote site.

28. A system employing computer hardware having one or more computer processors and program instructions stored in a computer readable medium for discriminating remote site origination of communication signals received by a reference site from a site remotely accessed through a network interconnection, based upon envelope characteristics of the transmitted communication signals, comprising:

a capture unit executed on one or more of the computer processors, said capture unit time-capturing a plurality of segments of the communication signals transmitted during an interconnected session interactively established between one of the remote sites and the reference site;

a parsing unit executed on one or more of the computer processors, said parsing unit being coupled to said capture unit to selectively generate for the interconnected remote site an envelope signal indicative of at least one resource allocation response thereof during the interconnection session, wherein:

each said generated envelope signal is distinct to the interconnected remote site and is formed by at least one time-series vector derived from a waveform defined by time-ordered values of at least a first predetermined envelope parameter acquired from the time-captured segments, each envelope parameter defined in at least one communication packet of the time-captured segments according to a communication protocol shared by the remote sites and the reference site; and, said parsing unit generates for each remote site having a resource allocation response accessing multiple resources a plurality of envelope sub-signals each corresponding to one accessed resource, said envelope signal thereby including a concatenation of said envelope sub-signals one with the other;

a signature unit executed on one or more of the computer processors, said signature unit being coupled to receive said envelope signal from said parsing unit for each interconnected remote site to be identified, said signature unit establishing responsive to said envelope signal a characteristic signature for uniquely identifying the interconnected remote site, newly-captured communication signal segments being thereby classified in remote site origination based on said characteristic signatures of identified remote sites; and, a classifier unit coupled to receive from said parsing unit said envelope signal generated thereby for newly-captured communication signal segments from an interconnection session established between an unidentified remote site and the reference site, said classifier unit classifying the newly-captured communication signal segments in remote site origination responsive to comparison of said envelope signal thereof with said characteristic signatures of identified remote sites, an alert generated responsive to classification of the unidentified remote site as suspicious;

wherein:

the remote sites are each websites on the world wide web, and the reference site is a client connected to the world wide web configured to communicate with the websites in accordance with a Hypertext Transfer Protocol (HTTP);

each resource allocation response of a website includes accessing at least one resource thereof by Universal Resource Identifier (URI); and, each said envelope sub-signal is defined by values of said first predetermined envelope parameter acquired from a portion of the time-captured segments received responsive to an HTTP "Get" command transmitted from the reference site, the HTTP "Get" command associated with one URI.

29. The system as recited in claim 28, wherein said parsing unit generates a plurality of said envelope signals for each remote site to be identified, a first of said envelope signals for the remote site being defined according to said first predetermined envelope parameter, and at least a second of said envelope signals for the remote site being defined according to a second predetermined envelope parameter.

30. The system as recited in claim 28, wherein:
each of the time-captured segments represents a packet of communications data transmitted through the world wide web according to the Transmission Control Protocol/Internet Protocol (TCP/IP).

31. The system as recited in claim 30, wherein:
each of the time captured-segments includes time and packet length information for the communications data transmitted thereby; and,
said first predetermined envelope parameter is defined by at least one of the time information and packet length information.

32. The system as recited in claim 28, wherein said signature unit includes a training portion generating said characteristic signature based quantitatively upon a plurality of said envelope signal samples generated for the same remote site to be identified.

33. The system as recited in claim 32, wherein said training portion generates said characteristic signature based upon a quantitative mean of said envelope signal samples for the remote site to be identified.

34. The system as recited in claim 32, wherein said classifier unit includes a comparison portion applying at least one predetermined comparison metric to compare each said envelope signal of the newly-captured communication signal segments with at least one of said characteristic signatures of identified remote sites, said comparison portion generating for each comparison a comparison value corresponding to each said predetermined comparison metric.

35. The system as recited in claim 34, wherein said classifier unit includes a decision portion coupled to said comparison portion, said decision portion applying a predetermined decision process upon said comparison values to classify each newly-captured communication signal segment in remote site origination, said predetermined decision process being selected from the group consisting of: a graphic linear support vector machine (SVM) process, a quantitative thresholding process, and a voting tree process.

36. The system as recited in claim 35, wherein said predetermined comparison metric is selected from the group consisting of: a norm of a vector distance, a root mean squared vector distance, a hamming distance, and a vector angle.

37. The system as recited in claim 35, wherein said predetermined comparison metric is based on a process selected from the group consisting of: a matched filter process, a principle component process, and a sparse decomposition process.

38. The system as recited in claim 35, wherein said training portion of said signature unit generates for each of the identified remote sites at least one website separation parameter indicative of permissible variation in said comparison value for classification with the identified remote site, said training portion generating said separation parameter at least partially based upon a plurality of false training envelope signals obtained for time-captured segments of communication signals originating from one or more sites different from the identified remote site.

\* \* \* \* \*